(12) United States Patent
Henriksen et al.

(10) Patent No.: US 11,448,849 B2
(45) Date of Patent: Sep. 20, 2022

(54) OPTICAL ELEMENT WITH STRESS DISTRIBUTING SUPPORTING STRUCTURE

(71) Applicant: poLight ASA, Skoppum (NO)

(72) Inventors: Lars Henriksen, Tønsberg (NO); Vladimir Kartashov, Horten (NO); Janne Tapani Kilpinen, Akaa (FI)

(73) Assignee: poLight ASA, Skoppum (NO)

( * ) Notice: Subject to any disclaimer, the term of this patent is extended or adjusted under 35 U.S.C. 154(b) by 0 days.

(21) Appl. No.: 17/051,642

(22) PCT Filed: May 24, 2019

(86) PCT No.: PCT/EP2019/063502
§ 371 (c)(1),
(2) Date: Oct. 29, 2020

(87) PCT Pub. No.: WO2019/224367
PCT Pub. Date: Nov. 28, 2019

(65) Prior Publication Data
US 2021/0231903 A1    Jul. 29, 2021

(30) Foreign Application Priority Data
May 24, 2018   (EP) .................................... 18174036

(51) Int. Cl.
G02B 7/02        (2021.01)
G02B 13/00       (2006.01)
G02B 26/08       (2006.01)

(52) U.S. Cl.
CPC ........... *G02B 7/02* (2013.01); *G02B 13/0075* (2013.01); *G02B 26/0825* (2013.01)

(58) Field of Classification Search
CPC .. G02B 7/02; G02B 13/0075; G02B 26/0825; G02B 26/08
See application file for complete search history.

(56) References Cited

U.S. PATENT DOCUMENTS

2010/0165475 A1* 7/2010 Lee .......................... G02B 1/06
359/666

FOREIGN PATENT DOCUMENTS

| WO | WO 2008/035983 A1 | 3/2008 |
| WO | WO 2008/100154 A1 | 8/2008 |
| WO | WO 2016/009078 A1 | 1/2016 |

OTHER PUBLICATIONS

International Search Report for PCT/EP2019/063502 dated Jul. 30, 2019.

* cited by examiner

*Primary Examiner* — James C. Jones
(74) *Attorney, Agent, or Firm* — Knobbe Martens Olson & Bear LLP

(57) ABSTRACT

There is presented an optical element 100, such as a tuneable lens, wherein there is provided means 128 to mitigate problems with stress concentration in a bendable cover member 102 at a border of a supporting structure 101, which in the absence of said means would entail a stress singularity issue due to an abrupt change in mechanical properties around the bendable cover member 102.

13 Claims, 15 Drawing Sheets

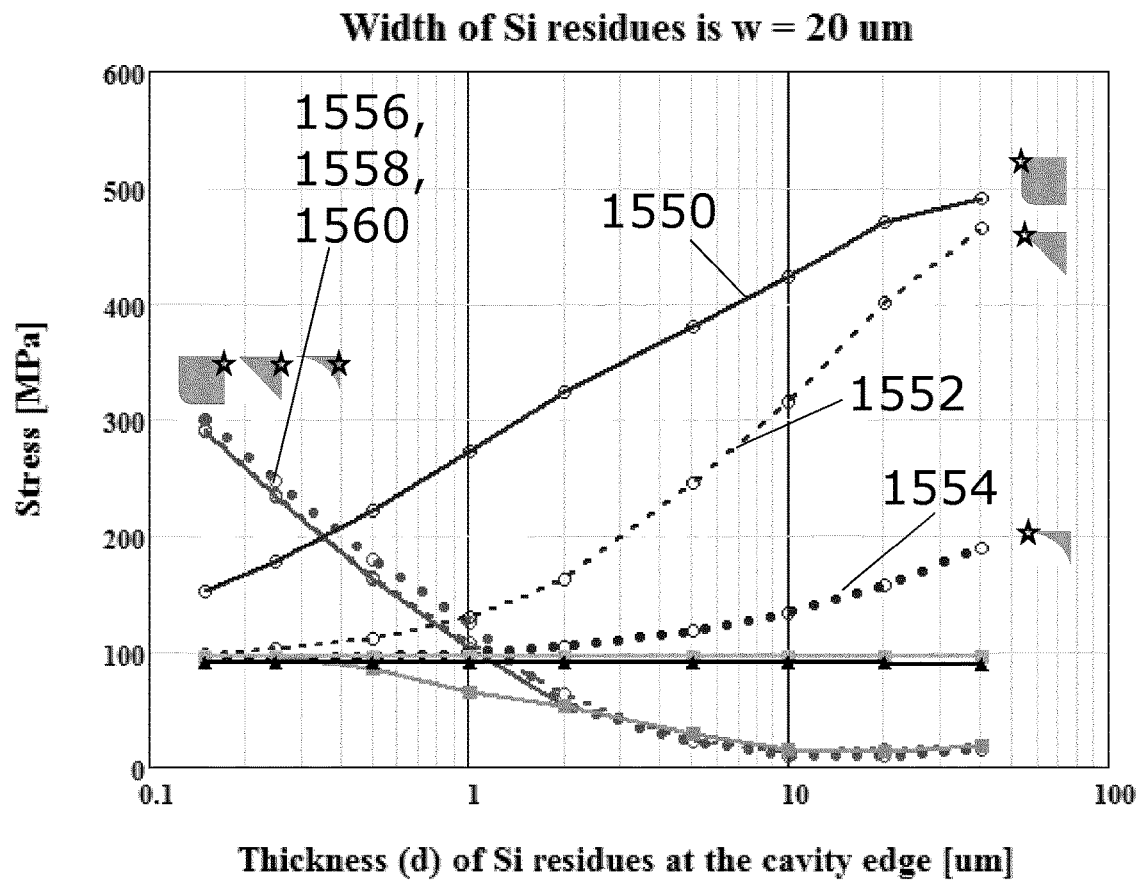

FIG. 15

○─○─○ Peak stress at the cavity edge; rectangular Si residues
○-○-○ Peak stress at the cavity edge; triangular Si residues
●•●•● Peak stress at the cavity edge; rounded Si residues
○─○─○ Peak stress at the edge of rectangular Si residues
○-○-○ Peak stress at the edge of triangular Si residues
●•●•● Peak stress at the edge of rounded Si residues
■─■─■ Reference stress at the cavity edge
■─■─■ Reference stress at 20 um from the cavity edge
▲─▲─▲ Stress in the aperture center

FIG. 16

OPTICAL ELEMENT WITH STRESS DISTRIBUTING SUPPORTING STRUCTURE

CROSS REFERENCE TO RELATED APPLICATIONS

This application is a U.S. National Phase Application of PCT International Application Number PCT/EP2019/063502, filed on May 24, 2019, designating the United States of America and published in the English language, which is an International Application of and claims the benefit of priority to European Patent Application No. 18174036.6, filed on May 24, 2018. The disclosures of the above-referenced applications are hereby expressly incorporated by reference in their entireties.

FIELD OF THE INVENTION

The present invention relates to optical elements, and more particularly optical elements with a bendable cover member and one or more actuators for shaping said bendable cover member, and corresponding use, optical devices and method of manufacturing a said optical elements.

BACKGROUND OF THE INVENTION

There is an ever increasing demand for low cost, high volume solutions for optical (micro-)elements, such as lens assemblies, with adjustable focal length and the highest possible imaging quality and which are impact resistant. Modern mobile phones, for example, are now equipped with miniature digital camera modules and the quality and cost demands for optical elements, such as lenses and lens assemblies, are increasing and they are required to be impact resistant. More and more miniature cameras used in mobile phones and laptop computers have auto focus functionality. The design of, e.g., lens systems for such applications requires fulfilment of a large number of requirements, from production standards to ease of operation when fitting the lens on top of a camera module. These challenges are even greater when the lens arrangement comprises tuneable parameters, such as encountered in auto focus lenses, wherein the focal length must be adjusted, for example, to fit the distance from the lens to the object to be photographed. Such optical elements are usually complex designs comprising movable parts that can make it difficult to assemble the optical element in a simple manner. A further challenge with such designs is the ever-increasing requirements to provide suitable optical elements, such as lens assemblies, for such use. It is particularly challenging to make these optical elements impact resistant and in particular when the optical and mechanical properties must be kept at a high level.

There exist a number of solutions for making compact auto focus optical elements. One of the problems of current solutions is how to provide good impact resistance, such as good impact resistance while maintaining good optical and mechanical properties.

Hence, an optical element with improved impact resistance would be advantageous, and in particular an optical element, such as a tuneable optical micro lens with improved impact resistance, where the means for enabling good impact resistance entails only little or no degradation in optical and mechanical properties, would be advantageous.

SUMMARY OF THE INVENTION

It may be seen as an object of the present invention to provide an optical element, such as a tuneable optical element, that solves the above mentioned problems of the prior art, such as to provide an optical element (such as a tuneable optical element) with improved impact resistance. It may be seen as a further object of the present invention to provide an alternative to the prior art.

Thus, the above described object and several other objects are intended to be obtained in a first aspect of the invention by providing an optical element, such as an optical lens, such as a tuneable optical lens, defining an optical axis and comprising:

A supporting structure,
a bendable cover member attached to the supporting structure, wherein an interface between the bendable cover member and the supporting structure defines an interface plane, such as the interface plane being orthogonal to the optical axis, such as the optical element further comprising at least one deformable transparent lens body attached to the bendable cover member,
one or more actuators, such as one or more piezoelectric actuators, arranged for shaping said bendable cover member into a desired shape,
wherein
one or more of
 a dimension in a direction being parallel with the optical axis, and/or
 a Young's modulus of the supporting structure on one side of the interface plane increases gradually and/or in a plurality of steps along at least a portion of a line being orthogonal to the optical axis and intersecting the optical axis and in a direction away from the optical axis, wherein said line spans a range from a point at an inner edge of the interface and a point more distantly placed with respect to the optical axis,
and/or wherein
a dimension of the bendable cover member in a direction being parallel with the optical axis is larger, such as 10% or more larger, such as 20% or more larger, such as 50% or more larger, such as 100% or more larger or 1 micrometer or more larger, such as 2 micrometer or more larger, such as 5 micrometer or more larger, such as 10 micrometer or more larger,
 at at least one first point at an inner edge of the interface, than
 at at least one second point on a line from said first point to the optical axis.

The invention is particularly, but not exclusively, advantageous for obtaining an optical element, such as optical (refractive) lens or a reflective element, such as a tuneable micro lens or a tuneable micro mirror, which may have improved impact resistance and/or improved ability to endure an impact ensuing a drop. Another possible advantage may be that the proposed solution does not significantly impair optical properties (such as wavefront error and/or transmittance and/or tuneability, e.g., range of dioptres, which may be spanned) and/or mechanical properties (such as flexural rigidity of the bendable cover member).

It may be seen as an insight of the present inventors that an abrupt change, such as a single abrupt change, in mechanical properties at, e.g., an inner edge of a supporting structure may lead to excessively large stresses, such as excessively large stresses in the bendable cover member. The features of the present invention may enable avoiding such excessively large stresses. It may be seen as an insight of the present invention, that stresses at such abrupt changes (singularities) may advantageously be redistributed, such as via structures which change thickness and/or Young's modulus gradually or in a plurality of steps.

More particularly, the supporting structure may increase thickness and/or Young's modulus (such as "spring constant") gradually and/or in a plurality of steps (such as not in a—single—step function) and/or the bendable cover member may be thicker (i.e., have a larger dimension in a direction being parallel with the optical axis) at the contact point with the supporting structure—such as at a sidewall of the supporting structure—than inside the supporting structure (such as closer to the optical axis). By 'thickness' may be understood 'thickness of coherent material', such as if there is a gap in the material then only the material until the gap contributes to the thickness, whereas material below the gap does not.

It is understood that the supporting structure on the one side of the interface plane may comprise a combination of gradual and stepwise increases of the thickness, i.e. a portion of the supporting structure may be formed with a gradual increase of the thickness and another portion of the supporting structure may be formed with stepwise increase of the thickness.

The stepwise increase of the thickness and/or Young's modulus with a plurality of steps may be in a form which approximates the gradual increase of the thickness/Young's modulus. Accordingly, the plurality of steps may comprise at least 3 or 4 steps, such as at least 6 or at least 10 steps in order to approximate a continuous gradual increase. As noted elsewhere, the gradual or approximated gradual increase of thickness may improve mechanical properties with respect to improved impact resistance. Equivalently, the gradual or approximated gradual increase of the Young's modulus similarly improves the mechanical properties. The stepped increase of the thickness/Young's modulus is an approximation to a continuous increase of the thickness/Young's modulus. However, whether the increase is in the form of multiple steps or a continuous variation, both examples exhibits a gradual increase of the thickness/Young's modulus. Accordingly, the stepped increase of the thickness or Young's modulus is an example of the gradual increase of the thickness (i.e. dimension in a direction being parallel with the optical axis) or Young's modulus.

For example, the supporting structure may comprise a combination of different layers deposited and patterned separately from the front side of a wafer. They could be of different materials, such that the selectivity of the back side etching would lead to the desired stepped shape.

The extension of the line where at least a portion of the increasing thickness is formed extends a point at an inner edge of the interface to the point more distantly placed with respect to the optical axis. Accordingly, the point at the inner edge of the interface is located closer to the optical axis than the more distantly placed point—and the line extends between these points.

The shaping of the bendable cover member into a desired shape by means of the one or more actuators may be achieved by the stress generated by the actuators on the cover member which thereby responds with a deformation dependent on the stress and location of the actuators.

A possible advantage of the present invention may be that it enables providing the supporting structure and placing the cover member thereon and then —without necessitating further steps and/or additional reinforcing elements on the opposite site of the cover member (with respect to the supporting structure) —features of the present invention may be integrated. The invention may thus be seen as enabling a simple and/or efficient method of manufacturing (regardless of whether the supporting structure and/or the cover member is arranged to mitigate the stress singularity issue described above). It may be an advantage, that other elements, such as actuators, can be placed on the opposite side of the cover member (with respect to the supporting structure), such as without interfering with features arranged to mitigate the stress singularity issues described above.

By 'optical element' may be understood an element which acts upon (such as manipulates) light passing through the element (such as the element being an optical lens, such as an optical refractive lens) or which acts upon light being reflected from the optical element (such as the optical element being a reflective element or a reflective mirror).

The optical element may in general be a tuneable optical element. By 'tuneable' may be understood that a focal length of the optical element may be tuned, such as by actuation of the actuators, e.g., (where the actuators are piezoelectric actuators) by changing an applied voltage of the one or more piezoelectric actuators arranged for shaping said bendable cover member into a desired shape.

The deformable transparent lens body such as a transparent, deformable, non-fluid body. The deformable, non-fluid lens body is preferably made from an elastic material such as an elastic polymer-material. Since the lens body is non-fluid, no tight enclosure is needed to hold the lens body, and there are no risk of leakage. The lens body may be made from a soft polymer, which may include a number of different materials, such as silicone, polymer gels, a polymer network of cross-linked or partly cross-linked polymers, and a miscible oil or combination of oils. The elastic modulus of the non-fluid lens body may be larger than 300 Pa, thereby avoiding deformation due to gravitational forces in normal operation. The refractive index of the non-fluid lens body may be larger than 1.3.

Using a soft polymer makes it possible to produce lenses where the polymer is in contact with air, thus requiring much less force when adjusting the focal length of the lens, e.g. as compared to case when the polymer fills the entire cavity. It also eases the production, as the polymer will keep in place even if the different production steps are localized in different positions or facilities.

'Optical axis' is commonly understood in the art, and is understood to intersect the cover member (and, in case of the optical element being an optical lens, the optical axis is also understood to intersect the lens body), such as pass through the lens body and the cover member.

It may in general be understood when referring to optical properties within this application, that the optical property (such as transmittance or opacity or transparency or reflectivity) applies for light travelling within an angle of incidence (AOI) with respect to the optical axis, such as through the optical aperture (for an optical lens) or being reflected of the optically active area (for a reflective element), wherein the angle of incidence is within an angle of 0-65°, such as 0-40° (such as 0°) with respect to the optical axis. An optical property may be understood to be an optical property at a specific wavelength, such as any wavelength within the visible region, such as 630 nm, and/or at a specific angle of incidence, such as 0°, such as at a wavelength of 630 nm and at an angle of incidence of 0°.

When referring to 'average' of an optical property, it is understood as a double average of said property within a wavelength range and an angle of incidence (AOI) with respect to the optical axis, wherein the wavelength range may be within 10 nm to 1 mm, such as wherein the wavelength range may correspond to one or more or all of:

the ultraviolet (UV) region, such as within 10-380 nm, the visible (VIS) region (which humans perceive or see as 'light'), such as within 380-760 nm the near-infrared (nIR) region, such as within 760-2,500 nm, the mid-infrared (mIR) region, such as within 2.50-10 micrometer, the far-infrared (fIR) region, such as within 10 micrometer-1 mm, and wherein AOI is 0-65°, such as 0-40°, such as 0°.

'Optical' is to be understood as relating to 'light', and 'light' is understood to be electromagnetic radiation within one or more or all regions corresponding to UV, visible, nIR, mIR and fIR, such as within the visible region.

Reference to 'transparent' is generally understood with reference to light, i.e., light may pass through a transparent object, with little or no intensity loss, such as losing on average 10% or less, such as on average 5% or less, when passing through the material (corresponding to an average transmittance of, respectively 90% and 95%).

By 'transmittance', such as the specular transmittance or regular transmittance, may in the present context of transmittance with respect to the optical element, such as the optical lens, be understood the average (within a wavelength range and within the angle of incidence range) ratio between Light being incident on the optical lens, and a portion of the light being incident on the optical lens, which portion is transmitted through the optical lens and emitted on the other side as specularly (regularly) transmitted light.

By 'sidewall' may be understood a support element or a part (such as a surface) of the support element, which at least partially supports the bendable cover member, such as supports the bendable cover member in a region immediately outside or close to the optically active area, such as the optical aperture.

By 'supporting structure' may be understood the structure, such as frame, which mechanically holds the bendable cover member in place, such as fixates the bendable cover member. In, e.g., a camera, the supporting structure fixates the cover member with respect to the remainder of the camera. The supporting structure can be monolithic, for example a silicon element with a protruding element inwards towards the optical axis, or non-monolithic (such as composed of two or more monolithic materials), for example a silicon element and an epoxy element protruding inwards towards the optical axis.

'Epoxy' is understood as is common in the art, and may in particular refer to the cured end products of epoxy resins. Epoxy resins, also known as polyepoxides, are a class of reactive prepolymers and polymers which contain epoxide groups.

In possibly advantageous embodiments, an epoxy may be applied which comprises or consists of liquid, flowable thermoset or UV-curable (or a combination) adhesives with or without inorganic or organic filler materials, which has a low viscosity achievable before curing sets in (such as a viscosity equal to or less than 5000 mPas (milli Pascal second), such as from room temperature (such as 20° C. or 293 K) to a temperature/time upon heating before viscosity increases due to cross-linking reactions in the adhesive), with Young's modulus after curing equal to or larger than 1 GPa. Additional possibly advantageous features of an applied epoxy may include one or more of: Low shrinkage, good thermal stability and good moisture resistance.

The bendable cover member may be relatively thin, such as thin with respect to the supporting structure (and/or the lens body when present), where "thin" refers to a (small) dimension in a direction along the optical axis, e.g., less than 1 mm, such as less than 0.75 mm, such as less than 0.5 mm, such as [10; 40] micrometer (i.e., within 10-40 micrometer). It may be made of any type of glass (such as glass with a Young's modulus within 10-100 GPa, such as within 20-100 GPa, such as within 20-60 GPa or within 30-70 GPa), such as borophosphosilicate glass (BPSG), such as any standard type of glass, or other material such as ceramic-glass, polymer, polymer-inorganic hybrid, such as being a so-called cover glass or being similar to a cover glass. These materials may in particular be relevant in embodiments where the bendable cover member should be transparent. By 'bendable' may be understood that an element, such as the bendable cover member, may be bent by the one or more actuators, i.e., actuation of the one or more actuators may bend the element. The 'bendable cover member' may be referred to interchangeably with "cover member".

In an embodiment there is presented an optical element, wherein the bendable cover member comprises, such as consists of, a material having a Young's modulus of at least 10 GPa, such as within 10-100 GPa, such as within 20-100 GPa, such as within 20-60 GPa or within 30-70 GPa. An advantage of this (such as a relatively rigid cover member) may be that it enables or facilitates that the one or more piezoelectric actuators are defining the optically active area, such as the aperture, while it is still possible to shape the cover member in the optically active area, such as the aperture (although no piezoelectric actuators are there) with the one or more piezoelectric actuators.

The bendable cover member may (in case of the optical element being an optical lens) be a bendable transparent cover member, and may more particularly have a transmittance of 98% or more for light, and/or a stress less than or equal to 20 MPa.

This may for example be realized if the bendable transparent cover member is made of glass.

In an embodiment there is presented an optical element, wherein the bendable cover member extends beyond the inner edges of the sidewall. It is to be understood that the inner edges of the sidewall correspond to the surface of the sidewall, such as the surface of the sidewall facing the deformable lens body in the case of the optical element being an optical lens. In other words, the bendable cover member extends further away from the optical axis than the surface of the sidewall facing, such as the surface of the sidewall facing the optical axis (and optionally the deformable lens body).

'Actuators' are known in the art, and may for example be any one of thermal actuators, electrostatic actuators, magnetic actuators or piezoelectric actuators.

By 'arranged for shaping said bendable cover member into a desired shape', may be understood that the shape, size and position of the actuators relative to the cover member enables them upon actuation, such as (in case of piezoelectric actuators) upon an applied voltage across their electrodes, to deform and thereby shape said bendable cover member into a desired shape. It is understood that at least a portion of the cover member is in the optically active area, such as the optical aperture, such as the portion of the cover member being intersected by the optical axis is being shaped into a desired shape.

By 'desired shape' may be understood that when going from a shape to a desired shape (such as from one desired shape to another desired shape), then the focal length of the optical element may change.

It may be possible to mitigate the stress singularity issue by arranging the supporting structure so that one or more of a dimension in a direction being parallel with the optical axis, and/or a Young's modulus of the supporting structure on one side of the interface plane increases gradually and/or in a plurality of steps along at least a portion of a line being orthogonal to the optical axis and intersecting the optical axis and in a direction away from the optical axis, wherein said line spans a range from a point at an inner edge of the interface and a point more distantly placed with respect to the optical axis. By this arrangement, the "spring constant" (where "spring constant" is understood to be a constant k relating force F and displacement x, such as in Hooke's law, F=kx) of the supporting structure as seen by the bendable cover member, may vary from zero at the optical axis (where there may be no supporting structure) and increase gradually or in a plurality of steps in a direction away from the optical axis, such as at least from an inner edge of the interface between the cover member and the supporting structure. Thus, the variation in maximum reaction force between supporting structure and cover member may also increase gradually or in a plurality of steps in a direction away from the optical axis.

It is noted that the position of the line segment along which the thickness is measured is a line segment oriented outwards in a radial direction with respect to the optical axis and starting from a first point of contact between the supporting structure and the cover member, covering at least a portion of the supporting structure radially outside said first point of contact, and ending at a point more distantly placed with respect to the optical axis than said first point of contact. Said line segment may have a length being equal to or less than 1 mm, such as equal to or less than 750 µm, such as equal to or less than 500 µm, such as equal to or less than 400 µm, such as equal to or less than 300 µm, such as equal to or less than 290 µm, such as equal to or less than 250 µm, such as equal to or less than 200 µm, such as equal to or less than 150 µm, such as equal to or less than 100 µm, such as equal to or less than 50 µm, such as equal to or less than 40 µm, such as equal to or less than 20 µm, such as equal to or less than 10 µm, such as equal to or less than 2 µm. A thickness, such as a dimension in a direction parallel with the optical axis, of the supporting structure across said line segment may be equal to or less than 1 mm, such as equal to or less than 750 µm, such as equal to or less than 500 µm, such as equal to or less than 400 µm, such as equal to or less than 300 µm, such as equal to or less than 290 µm, such as equal to or less than 250 µm, such as equal to or less than 200 µm, such as equal to or less than 150 µm, such as equal to or less than 100 µm, such as equal to or less than 50 µm, such as equal to or less than 40 µm, such as equal to or less than 20 µm, such as equal to or less than 10 µm, such as equal to or less than 2 µm. In particular embodiments, both of a length of said line segment and a dimension of the supporting structure across said line segment may be equal to or less than 1 mm, such as equal to or less than 750 µm, such as equal to or less than 500 µm, such as equal to or less than 400 µm, such as equal to or less than 300 µm, such as equal to or less than 290 µm, such as equal to or less than 250 µm, such as equal to or less than 200 µm, such as equal to or less than 150 µm, such as equal to or less than 100 µm, such as equal to or less than 50 µm, such as equal to or less than 40 µm, such as equal to or less than 20 µm, such as equal to or less than 10 µm, such as equal to or less than 2 µm.

By 'a Young's modulus of the supporting structure' is understood a Young's modulus of the material of the supporting structure. By 'increases gradually and/or in a plurality of steps' may in terms of Young's modulus be understood an increase in relative terms, such as 10% or more, 20% or more, 50% or more or 100% or more larger.

By 'increases gradually and/or in a plurality of steps' may in terms of dimensions be understood an increase in absolute terms. Said increase may be 1 micrometer or more, such as 2 micrometer or more, such as 5 micrometer or more, such as micrometer or more, such as 20 micrometer or more, such as 40 micrometer or more, such as 50 micrometer or more. Said increase may be 100 micrometer or less, such as 50 micrometer or less, such as 40 micrometer or less, such as 20 micrometer or less, such as 10 micrometer or less, such as 5 micrometer or less. In a specific embodiment, said increase is within 1 micrometer to 100 micrometer, such as within 10 micrometer to 100 micrometer, such as within 10 micrometer to 50 micrometer, such as within 20 micrometer to 40 micrometer.

A distance between the point at an inner edge of the interface and the point more distantly placed with respect to the optical axis may be 1 micrometer or more, such as 2 micrometer or more, such as 5 micrometer or more, such as 10 micrometer or more, such as 20 micrometer or more, such as 40 micrometer or more, such as 50 micrometer or more. A distance between the point at an inner edge of the interface and the point more distantly placed with respect to the optical axis may be 100 micrometer or less, such as 50 micrometer or less, such as 40 micrometer or less, such as 20 micrometer or less, such as 10 micrometer or less, such as 5 micrometer or less. In a specific embodiment, said distance is within 1 micrometer to 100 micrometer, such as within 10 micrometer to 100 micrometer, such as within 10 micrometer to 50 micrometer, such as within 20 micrometer to 40 micrometer.

In a still more specific embodiment, said increase in dimension in a direction being parallel with the optical axis is within 1 micrometer to 100 micrometer, such as within 10 micrometer to 100 micrometer, such as within 10 micrometer to 50 micrometer, such as within 20 micrometer to 40 micrometer, and said distance is within 1 micrometer to 100 micrometer, such as within 10 micrometer to 100 micrometer, such as within 10 micrometer to 50 micrometer, such as within 20 micrometer to 40 micrometer. In a still more specific embodiment, said increase is within 10 micrometer to 100 micrometer and said distance is within 10 micrometer to 100 micrometer. In a still more specific embodiment, said increase is within 20 micrometer to 40 micrometer and said distance is within 20 micrometer to 40 micrometer.

It may be possible to mitigate the stress singularity issue by arranging the bendable cover member so that a dimension (such as thickness) of the bendable cover member in a direction being parallel with the optical axis is larger at at least one first point at an inner edge of the interface, than at at least one second point on a line from said first point to the optical axis. By this arrangement, the bendable cover member may experience an abrupt change in "spring constant" of the supporting structure, but it may be sufficiently thick at that abrupt change that it can handle it, but may simultaneously be thin enough at an area within the supporting structure that it can exhibit good optical and/or mechanical properties. The interface referred to above is the interface between the supporting structure and the bendable cover member as observed in the direction being parallel with the optical axis.

In an embodiment there is presented an optical element, wherein the optical element does not comprise liquid. In an embodiment there is presented an optical element, wherein the optical element is solid or gaseous, such as consists of solid or gaseous elements. In an embodiment there is presented an optical element, wherein the optical element is solid, such as consists of solid elements.

The optical lens may in general be a micro lens, such as a tuneable micro lens. By 'micro lens' may in general be understood a lens wherein a dimensions of at least one structural component, such as the thickness (dimension in a direction parallel with the optical axis), is within the range 1 micrometer to 1 millimeter. In the present application, reference to thickness is a reference to geometrical thickness (as opposed to optical thickness). In an embodiment, the thickness may be the sum of the support structure (e.g., silicon), which may be 200-800 micrometer, the cover member and the one or more piezoelectric actuators including electrical contacts, which may be about 22 micrometer. The optical lens may be similar albeit not identical to (due to the claimed features) a tuneable micro lens known as a TLens® obtainable from the company poLight, Norway. The optical lens may in particular be a tuneable micro lens corresponding (albeit not identical) to the tuneable micro lens disclosed in the patent application WO2008100154 (A1) with the title "Flexible lens assembly with variable focal length", which application is hereby included by reference in entirety. It is additionally noted regarding the reference WO2008100154 (A1) that certain dimensions may be converted from micrometers into millimeters, and in particular the dimensions referred to as $d1_{PZT}$, $d2_{PZT}$ and $w_{pol.}$ (see for example FIG. 1c, subfigure I) on figure page 1/5) may in realizations have the numerically same values albeit given in units in mm (millimeter) instead of μm (micrometer), more particularly:

$d1_{PZT}$=4 mm, $d2_{PZT}$=1.5 mm, and $w_{pol.}$=4.5 mm.

In an embodiment there is presented an optical element, wherein a thickness of the optical element is equal to or less than 1 mm, such as equal to or less than 700 micrometer, such as equal to or less than 500 micrometer, such as equal to or less than 450 micrometer, such as equal to or less than 425 micrometer, such as equal to or less than 400 micrometer. A possible advantage of having a small thickness is that it enables an optical lens with a very small vertical footprint. This small vertical footprint may in turn optionally allow thinner optical devices, such as cameras, with smaller vertical footprint that can then be integrated into thinner devices, such as mobile phones, than presently allowed today. By 'thickness of the optical lens' may be understood the dimension of the optical length in a direction parallel with the optical axis (such as the distance between two planes being orthogonal with respect to the optical axis and being placed on either side of the optical lens).

In an embodiment there is presented an optical element, wherein the supporting structure comprises:
A support element, such as the support element being a silicon element,
a structural element, such as the structural element being an epoxy element, such as where some or all of the structural element is placed closer to the optical axis than the support element, adjoining
the support element, and
the bendable cover member.

A possible advantage of having a structural element adjoining the support element, and the bendable cover member may be that it renders it superfluous to provide a monolithic supporting structure, with the claimed features (which may be challenging). For example, it may be possible to provide a monolithic supporting structure in silicon with the claimed features, but it is challenging and may result in low yield. Introduction of a structural element as described may render it possible to provide in a simple and efficient manner a supporting structure with, e.g., an epoxy based structural element, wherein a dimension in a direction being parallel with the optical axis of the structural element (of the supporting structure) on one side of the interface plane increases gradually along at least a portion of a line being orthogonal to the optical axis and intersecting the optical axis and in a direction away from the optical axis. In an embodiment, said structural element has a first dimension in a direction being parallel with the optical axis within 1 micrometer to 300 micrometer, such as within 1 micrometer to 100 micrometer, such as within 10 micrometer to 100 micrometer, such as within 10 micrometer to 50 micrometer, such as within 20 micrometer to 40 micrometer. In an embodiment said structural element has a second dimension in a radial direction with respect to the optical axis within 1 micrometer to 300 micrometer, such as within 1 micrometer to 100 micrometer, such as within 10 micrometer to 100 micrometer, such as within 10 micrometer to 50 micrometer, such as within 20 micrometer to 40 micrometer. In an embodiment, a Young's modulus of said structural element is within 0.1-100 GPa, such as within 0.1-10 GPa, such as within 1-10 GPa, such as 3.5 GPa. In a still more specific embodiment, each of said first and second directions are within 1 micrometer to 300 micrometer, such as within 1 micrometer to 100 micrometer, such as within micrometer to 100 micrometer, such as within 20 micrometer to 40 micrometer, and a Young's modulus is within 0.1-100 GPa, such as within 0.1-10 GPa, such as within 1-10 GPa, such as 3.5 GPa. In a still more specific embodiment each of said first and second directions are within 20 micrometer to micrometer, and a Young's modulus of said structural element is within 1-10 GPa.

The structural element merely connects the support element with the bendable cover member and the structural element has an outer surface facing the optical axis. The outer surface extends from the support element to the bendable cover member and may be a plane surface or a curved surface such as an inwardly shaped or concave surface.

The material of the structural element may be selected among a plurality of materials. In embodiments the structural element material may be a polymer. In embodiments the structural element material may be an epoxy.

In embodiments the structural element may be organic reactive adhesives. For example, liquid structural element material, such as liquid organic/hybrid inorganic/organic adhesives that sets to a rigid cross-linked structure after curing, such as acrylics, polyurethanes, epoxies, polyimides, cyanoacrylates may be placed at the support element and/or the bendable cover member and the (solid) liquid structural element can then be formed via curing, such as wherein curing can be a thermally activated chemical crosslinking reaction, moisture activated curing, UV activated curing or a combination.

In embodiments filler material is added to the structural element material. Filler materials may be added to adhesives to obtain desirable properties, such as: Higher modulus, increased fracture resistance, better thermal stability, better mechanical strength or stability, or to modify flow properties in the uncured state. Filler materials can be in the form of particles, fibers, platelets and might be any kind of inorganic (or in some cases organic) minerals (oxides, nitrides, metals, glass, carbon). The filler materials may be anisotropic or isotropic (such as fibers vs spherical particles).

In embodiments the structural element comprises inorganic materials, such as sol-gels. There exists a number of materials that can have liquid-like properties before setting, and which through chemical/thermal processes becomes rigid, high modulus materials, such as materials which are typically denoted "sol-gel" systems. Some examples are: Nanoparticle ceramics dispersed in water or other liquid, which by a multi-step process of gelation, drying (to remove solvent) and sintering and maybe even a third crystallization step. Sol-gel techniques may be applied for producing thin films of ceramic materials (oxides, nitrides, carbides). In embodiment the structural element comprises, such as consists of, metals and/or ceramics. Metals and/or ceramics may be applied via sputtering (such as via physical vapour deposition (PVD)) with proper masking.

In an embodiment there is presented an optical element, wherein a dimension (such as thickness) of the supporting structure, such as of the structural element, in a direction being parallel with an optical axis of the optical element increases gradually and/or in a plurality of steps along a line orthogonal to the optical axis from the optical axis and away from the optical axis. A possible advantage of this may be that it enables that the Young's modulus of the supporting structure can be kept constant, because the increase in thickness may be utilized to increase gradually and/or in a plurality of steps the spring constant of the supporting structure, so that the stress singularity issue is reduced or eliminated.

In an embodiment there is presented an optical element, wherein the optical element endures an acceleration and/or deceleration of at least 5000 (five thousand) g, such as at least 10000 g, such as at least 15000 g, such as at least 30000 g, such as at least 50000 g, in a direction parallel with the optical axis, such as an acceleration in a negative direction (i.e., in a direction parallel to the optical axis from the cover member to the supporting structure, which would correspond to an impact on a drop where the cover member is facing in a direction of gravity) and/or a positive direction. By 'endures' may in this context be understood that any one or more or all of the parameters given by a range of dioptres which the one or more actuators upon actuation are capable of deforming the bendable cover member throughout, transmittance, such as transmittance at 630 nm, total wavefront error ($WFE_{RMS}$), shall after the acceleration and/or deceleration remain within an interval given by [90; 110] % (such as ±10%) with respect to the value of said parameter before the acceleration and/or deceleration.

The endurable acceleration is achieved at least partially by means of the support structure, particularly due to the gradually or stepwise increasing thickness and/or Young's modulus. The acceleration specification may be achieved by various designs of the support structure which can be designed with different dimensions of the part with increasing thickness and/or Young's modulus, different Young's modulus values and different shapes.

In an embodiment (such as an embodiment with a support element and a structural element) there is presented an optical element, wherein the structural element is placed adjacent, such as adjoining, a sub-interface between the support element and the bendable cover member, such as a side of said sub-interface facing the optical axis. A possible advantage of this (such as having the structural element in the corner where a supporting structure with a sidewall parallel or substantially parallel with the optical axis and facing the optical axis meets the cover member being orthogonal to the optical axis or being placed between the support element and the cover member and extending further towards the optical axis than the support element) may be that this is a position where the structural element may aid in mitigating the stress singularity issue. The prefix 'sub' (in 'sub-interface) may be understood to denote that since the supporting structure has an interface with the cover member, the structural element (being a part of the supporting structure) can only have a sub-interface of this interface.

In an embodiment (such as an embodiment with a support element and a structural element) there is presented an optical element, wherein some or all of the structural element is placed and/or extends further towards the optical axis than the support element, such as at least 5 µm, such as at least 10 µm, such as at least 15 µm, such as at least 20 µm, such as at least 30 µm, such as at least 40 µm, such as at least 50 µm further towards the optical axis than then support element. A possible advantage of this may be that this is a position where the structural element may aid in mitigating the stress singularity issue.

In an embodiment (such as an embodiment with a support element and a structural element) there is presented an optical element, wherein the structural element is encircling, such as completely (360 degrees) encircling, an optical axis of the optical element. A possible advantage of this may be that it enables that the stress singularity issue is mitigated or overcome all around the optical axis.

In an embodiment (such as an embodiment with a support element and a structural element) there is presented an optical element, wherein a material of the structural element is different from a material of the support element, such as a material of the support element at the point where the support element adjoins the structural element, and a material of the bendable cover member, such as a material of bendable cover member at the point where the support element adjoins the structural element.

In a particular embodiment, the material of the structural element (such as epoxy) is different from both the material of the support element (such as silicon) and the material of the bendable cover member (such as glass). In an alternative embodiment, a material of the structural element is different from a material of the support element or a material of the bendable cover member.

In an embodiment (such as an embodiment with a support element and a structural element) there is presented an optical element, wherein the structural element comprises, such as consists of, a polymer.

In an embodiment there is presented an optical element, wherein the structural element comprises, such as consists of, epoxy.

In an embodiment there is presented an optical element, wherein a surface of the structural element as observed from an optical axis of the optical element is concave. Thus, the concavity is seen when observed from the optical axis and towards the concave surface, either along a direction perpendicular to the optical axis or a direction which makes an acute angle with the optical axis. A possible advantage of this may be that it can be realized by wetting and/or capillary forces. Another possible advantage may be that it facilitates good mechanical properties, such as low stress concentration factors in the bendable cover member during impact at the inner sidewall of the supporting structure and at the inner edge of the structural element.

In general the improved mechanical properties which improves impact resistance are not only obtained with a concave surface of the structural element, but may be achieved with any curved surface or plane surface (according to the first aspect) as long as the thickness of the support structure in the direction of the optical axis changes gradually or stepwise from a low thickness where this part of the support structure is closest to the optical axis to a larger highest thickness at the sidewall of the supporting structure. The gradually increasing thickness could affect light transmitted through the gradually varying thickness to generate imaging distorting of the lens embodied by the optical element. However, as long as the lens does not receive light transmitted through the gradually increasing thickness, the effect of the supporting structure with the gradually increasing thickness is irrelevant.

Furthermore, the optical aperture 111 (FIG. 1) is restricted by the inner edge of the piezoelectric actuator (layers 103, 104, 105). Light only goes through the aperture. Therefore, as long as the supporting structure is located beneath the piezoelectric actuator it does not matter if it is transparent or not.

In an embodiment there is presented an optical element, wherein a diameter of an optically active area is 10 mm or less, such as 7.5 mm or less, such as 5 mm or less (such as [0.5; 4.0] mm), such as 2.5 mm or less (such as [2.0-2.4] mm), such as 1.9 mm or less, such as 1.55 mm or less, such as 1 mm or less. A possible advantage of having a small diameter is that it enables providing an optical lens, which may utilise very little area in a final application device (such as a camera) and/or where the small size facilitates that it can be installed in multiple positions for additional functionality (e.g. 3D imaging). By 'optically active area' may be understood an area upon which light may be incident and may be manipulated. For an optical lens the optically active area may correspond to (such as be identical to) the optical aperture. For a reflective element, such as a mirror, the optically active area may be a reflective area upon which light may be incident and from which manipulated light may be reflected (such as analogously to an aperture for an optical lens).

In an embodiment there is presented an optical element, wherein a diameter of the optically active area is 1 mm or more, such as 1.55 mm or more, such as 1.9 mm or more, such as 2 mm or more, such as 2.5 mm or more. A possible advantage of having a large diameter is that it enables providing a large amount of light.

The optical element may further comprise at least one deformable transparent lens body attached to the bendable cover member. This may in particular be relevant, if the optical element is a refractive optical element, such as a lens, such as a tunable lens. In an embodiment there is presented an optical element, wherein the optical element is a refractive lens comprising:

at least one deformable transparent lens body surrounded by a sidewall of the supporting structure, and wherein the bendable cover member is a bendable transparent cover member which is attached to a surface of said at least one deformable transparent lens body.

In an embodiment there is presented an optical element being an optical lens, wherein said at least one deformable transparent lens body comprises polymer, such as solid polymer, such as a deformable transparent lens body consisting of solid polymer. By said at least one deformable transparent lens body comprises polymer, such as solid polymer, may be understood that said at least one deformable transparent lens body comprises at least 10 wt % (weight percent), such as at least 25 wt %, such as at least 50 wt %, such as at least 75 wt %, solid polymer. In an embodiment there is presented an optical element being an optical lens, wherein said at least one deformable transparent lens body comprises a polymer network of cross-linked or partly cross-linked polymers and a miscible oil or combination of oils. In an embodiment there is presented an optical element being an optical lens, wherein said at least one deformable transparent lens body may have an elastic modulus larger than 300 Pa, a refractive index is above 1.35, and an absorbance in the visible range less than 10% per millimeter thickness.

'Refractive lens' is known in the art and understood accordingly. An advantage of refractive lenses may be that they require only low maintenance and generally do not require collimation or recoating to the same extent as reflective elements.

In an embodiment there is presented an optical element, wherein said optical element comprises one or more actuators for deforming (such as directly deforming) or shaping the bendable cover member, wherein the one or more actuators and the bendable cover member are arranged so that the one or more actuators upon actuation are capable of deforming or shaping the bendable cover member throughout a range of 5 dioptres or more, such as throughout a range of dioptres or more, such as throughout a range of 11 dioptres or more, such as throughout a range of 13 dioptres or more, such as throughout a range of [−3; +10] dioptres or more), such as throughout a range of 14 dioptres or more, such as 16 dioptres or more, such as 17 dioptres or more, such as 20 dioptres or more, such as through a range of [−10; +20] dioptres or more, such as throughout a range of 28 dioptres, such as throughout a range of 30 dioptres or more (such as [−4; +26] dioptres or more), such as throughout a range of 54 dioptres or more, (such as [−4; +50] dioptres or more). It may in general be understood, that the range spanned may include a magnification of 0 dioptres or more, such as a range spanning 0-5 dioptres or more, such as 0-6 dioptres or more, such as 0-7.5 dioptres or more, such as 0-10 dioptres or more, such as 0-12.5 dioptres or more, such as 0-14 dioptres or more, such as 0-16 dioptres or more, such as 0-20 dioptres or more, such as throughout a range of 28 dioptres or more, such as throughout a range of 30 dioptres or more (such as [−4; +26] dioptres or more), such as throughout a range of 54 dioptres or more (such as [−4; +50] dioptres or more). The range spanned may include a magnification of 0 dioptres and a range on both sides of zero, such as a range from/to ±2.5 dioptres or more (i.e., from −2.5 dioptres to 2.5 dioptres or more), such as ±6 dioptres or more, such as ±7.5 dioptres or more, such as ±10 dioptres or more, such as ±12.5 dioptres or more, such as ±14 dioptres or more, such as ±16 dioptres or more, such as ±20 dioptres or more, such as [−4; +26] dioptres or more, such as [−4; +50] dioptres or more.

By 'directly' (deforming) may be understood, that the one or more actuators are arranged with respect to the bendable cover member, so that the deformation of the bendable cover member is not dependent on a third element.

In an embodiment there is presented an optical element, wherein:

said optical element has an average (within a wavelength range and within the angle of incidence range) transmittance of 95% or more, such as 98% or more, such as 99% or more, and/or a minimum transmittance over the visible range (such as for any visible wavelength), such as for any visible wavelength, is 94% or more, and/or an average reflectivity (such as wherein the wavelength range is confined to any visible wavelength) over the visible range is 2.5% or less, such as 1% or less.

An advantage of a high transmittance may be that it facilitates that less light is lost when travelling through the optical device element. In general embodiments, said optical lens, has an average transmittance of 90% or more, such as 92% or more, such as 93% or more, such as 94% or more.

In an embodiment there is presented an optical element, wherein the optical element is a reflective element, and wherein the bendable cover member is reflective on the side facing away from the supporting structure and/or on the side facing the supporting structure. By 'reflective element' may be understood an element which reflects incident electromagnetic radiation, such as a mirror. By 'reflective' may be understood that the average (within a wavelength range and within the angle of incidence range) reflectivity is at least 90%, such as at least 95%, such as at least 99%, such as at least 99.9%. An advantage of reflective elements may be that they may suffer less from chromatic aberration compared to refractive optical elements. Another advantage of reflective elements may be that they can be relatively lighter than refractive optical components.

In an embodiment there is presented an optical element, wherein a total wavefront error ($WFE_{RMS}$) is equal to or less than 50 nm, such as 40 nm, such as nm, such as 25 nm, such as 20 nm, throughout a range of 5 dioptres or more, such as throughout a range of 10 dioptres or more, such as throughout a range of 11 dioptres or more, such as throughout a range of 13 dioptres or more, such as throughout a range of [−3; +10] dioptres or more), such as throughout a range of 14 dioptres or more, such as throughout a range of 15 dioptres or more. In a particular embodiment there is presented an optical element, wherein a total wavefront error ($WFE_{RMS}$) is equal to or less than 50 nm throughout a range of 15 dioptres or more. In a particular embodiment there is presented an optical element, wherein a total wavefront error ($WFE_{RMS}$) is equal to or less than 30 nm throughout a range of 15 dioptres. By having total $WFE_{RMS}$ being lower than a threshold throughout a range of another parameter, such as dioptres, it may be understood that the total $WFE_{RMS}$ is lower than the threshold for any value of the other parameter in the given range. A possible advantage of this embodiment may be that an improved image quality may be achieved throughout a range of dioptres and/or focal lengths. By 'total wavefront error ($WFE_{RMS}$)' is understood the total root-mean-square (RMS) wavefront error ($WFE_{RMS}$), which is commonly known in the art and understood accordingly. The total wavefront error (WFE) is defined for a given conjugation (object and image points). The wavefront error is defined for each point of the light beam. It is the optical path difference (OPD), such as the discrepancy in optical path lengths (OPL), between the actual (aberrated) wavefront and a perfect spherical wavefront. It is a distance usually expressed in nanometer (nm) or micrometer (μm). The total $WFE_{RMS}$ is defined for a given conjugation (object and image points). It is the root mean square of the total WFE over a cross section of the light beam on the surface on which it is calculated, such as described in the formula below:

$$\text{Total WFE\_RMS} = \sqrt{1/A \iint_A (WFE(P))^2 dP}$$

The integral is made across the area A of the cross section of the output pupil of the system. The total $WFE_{RMS}$ is a single value. It is a distance, usually expressed in nanometer (nm) or micrometer (μm). Measurement of total $WFE_{RMS}$ may be carried out using a wavefront measurement system with the Shack-Hartmann sensor, such as HASO™ from the company Imagine Optic (with headquarter address in Orsay, France). In an embodiment there is presented an optical element, wherein the total wavefront error ($WFE_{RMS}$) is measured at 630 nm, such as at a wavelength of 630 nm and at an angle of incidence of 0°.

In an embodiment, the Young's modulus of the supporting structure is less than the Young's modulus of the bendable cover member. For example, the supporting structure may comprise or consists of an adhesive like Epoxy which after being solidified, e.g. with a heating or UV curing process, has a Young's modulus value in the range of 1-20 GPa, such as 3.5 GPa. In comparison the bendable cover member, e.g. made of glass, may have a Young's modulus in the range from 10-100 GPa. For example, Young's modulus for borosilicate glass is 63 GPa, 73 GPa for fused silica glass and 44 GPa for borophosphosilicate glass. Advantageously, a supporting structure with a relative higher elasticity (i.e. lower Young's modulus) may be easier to attach in a reliable way to the cover member and the sidewall of the supporting structure.

In an embodiment, the plurality of steps comprise at least 4 steps. Advantageously, the stepped surface of the support structure approximates a support structure with a continuous structure with respect to it's mechanical properties.

In an embodiment, at least a portion of the supporting structure of which the dimension in the direction being parallel with the optical axis, and/or the Young's modulus increases gradually and/or in a plurality of steps is located separated from the at least one deformable transparent lens body.

The portion of the supporting structure of which the dimension in the direction being parallel with the optical axis, and/or the Young's modulus increases, such as the structural element, may be placed with a radial separation between the part of the structural element closest to optical axis and the part of the lens body being most distant from the optical axis. Thus, the structural element may circumscribe the lens body so that at no point along the circumference of the structural element there is direct contact between the structural element or the supporting structure and the lens body.

Advantageously, the placement of the structural element distanced from the lens body ensures that the structural element does not interfere with the light propagation in the lens body. Furthermore, due to the non-contact between the structural element or said portion of the supporting structure and the lens body, the lens body is not exposed to deformations or stresses due to deformations of the structural element.

In an example, the structural element or said portion of the supporting structure may be separated from the at least one deformable transparent lens body at least so that the portion of the structural element being closest to the optical axis does not extend into lens body. Thus, a minimal distance of substantially zero, e.g. a few micro meters may be allowed.

A second aspect relates to a method for providing the optical element according to the first aspect.

In an embodiment of the second aspect, the method is for improving impact resistance of the bendable cover member of the optical element.

In an embodiment of the second aspect, there is presented a method for manufacturing an optical element according to the first aspect and more particularly any embodiment of the first aspect wherein the supporting structure comprises:

A support element, and

A structural element, said method comprising placing a liquid structural element material at
the support element, and/or
the bendable cover member, such as said method comprising placing a liquid structural element material at the inner edge of the interface between the support element and the bendable cover membrane, so as to form the structural element.

For obtaining the structural element a solidifying process such as a curing process may be applied to achieve the desired mechanical properties of the liquid structural element material.

An advantage of this method may be that it is relatively simple to place a liquid material at said position(s). Another possible advantage may be that wetting and/or capillary forces may be utilized for redistribution of said liquid, which may be helpful in providing a relatively simple, yet efficient way in obtaining the claimed optical element. For the structural element being epoxy (such as cured epoxy in the optical lens), liquid structural material may be uncured epoxy resins. A possible advantage of placing the liquid structural element material at the inner edge of the interface between the support element and the bendable cover membrane may be that it is then placed (from the start) at the interface from which position wetting and/or capillary forces may (more easily) be utilized for redistribution of said liquid.

In an embodiment there is presented a method, wherein the liquid structural element material is redistributed via adhesive forces between the liquid structural element and
the support element, and/or
the bendable cover member beyond the position where it is placed, such as along an inner edge of the interface between the support element and the bendable cover member, such as the liquid structural element material is redistributed over a distance of at least 100 micrometer, such as at least 500 micrometer, such as at least 1000 micrometer, such as at least 2000 micrometer, via the adhesive forces.

A possible advantage of the redistributed via said adhesive forces may be that it facilitates providing or ensures an even distribution of the liquid structural element. Another possible advantage may be that the redistribution is carried out by itself. Another possible advantage may be that the redistribution can be controlled by controlling the surfaces of the supporting structure and/or the bendable cover member. By 'redistribution via adhesive forces' may be understood wetting and/or capillary forces.

In an embodiment there is presented a method, wherein the liquid structural element material is redistributed via adhesive forces between the liquid structural element and
the support element, and/or
the bendable cover member
so as to encircle, such as completely (360 degrees) encircle, an optical axis of the optical element.

In an embodiment there is presented a method, wherein the method further comprises solidifying the liquid structural element material, such as thereby forming the structural element.

The solidifying of the liquid structural element material may comprise a curing process of the liquid structural element after its redistribution along the bendable cover.

According to a third aspect, there is provided a camera comprising
an optical element according to the first aspect, such as wherein the bendable cover member is attached to the remainder of the camera, such as the camera excluding the optical element, via the supporting structure, or
An optical element as manufactured according to the second aspect, such as wherein the bendable cover member is attached to the remainder of the camera, such as the camera excluding the optical element, via the supporting structure.

It is understood that the optical element is a part of the camera. The optical element may be integrated with the camera, i.e. the camera without the optical element or the remainder of the camera, via the supporting structure so that the supporting structure is attached, e.g. glued, to a part of the camera. In this way, the bendable cover member is attached to the camera.

In a more general embodiment, there is provided an optical device comprising
an optical element according to the first aspect, or
an optical element as manufactured according to the second aspect, wherein the optical device may be any one optical device chosen from the group comprising, such as consisting of: a scanner, a camera, a variable optical tuner or attenuator, an iris, an optical image stabilisation (OIS) unit, a zoom lens, a wide angle lens, bar code reader, endoscope, projector or any device in which light is organised to create a desired effect (e.g. imaging).

According to a fourth aspect of the invention, there is provided use of
an optical element according to the first aspect, or
an optical element as manufactured according to the second aspect, for obtaining one or more images. In alternative embodiments, the optical element referred to, may be use for scanning identification marks, such as barcodes and/or retinas, or attenuating light of specific wavelengths.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The optical element, method, optical device and use according to the invention will now be described in more detail with regard to the accompanying figures. The figures show one way of implementing the present invention and is not to be construed as being limiting to other possible embodiments falling within the scope of the attached claim set.

FIG. 15 shows simulation results for three simulation models corresponding to FIGS. 12-14 for a width of the Si structural element being 20 µm.

FIG. 16 comprises a legend of the curves of FIGS. 15 and 17.

DETAILED DESCRIPTION OF AN EMBODIMENT

In general, when a direction is implied, such as when using the terms 'above' or 'below' or 'top' or 'bottom', it is in general understood that a positive direction is defined in a direction parallel to the optical axis from the supporting structure to the cover member. For example, the cover member is above the supporting structure such as on top of the supporting structure. Furthermore, 'inner' generally refers to a part of an element, such as a side or an end of an element, facing the optical axis, such as the element having an 'inner' side or end facing the optical axis and an 'outer' side or end facing away from the optical axis. Similarly, 'internal' (for example 'internal sidewall') refers to generally refers to a part of an element, such as a side or an end of an element, facing the optical axis, such as the element having an 'internal sidewall' facing the optical axis and an 'external sidewall' facing away from the optical axis.

Figure 1:
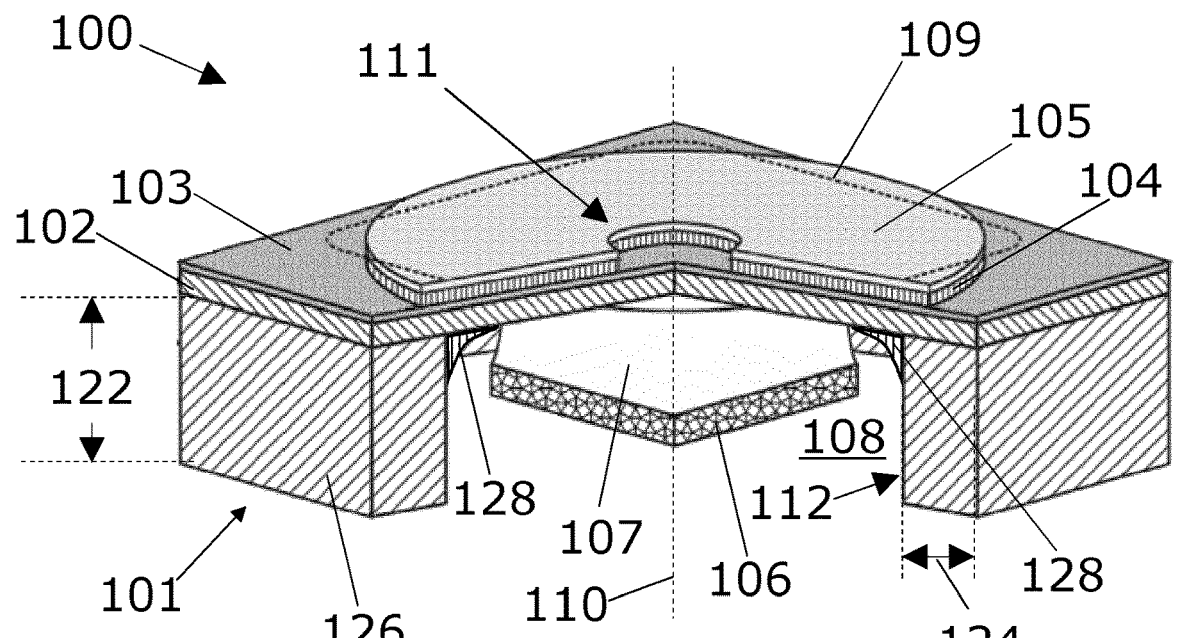
FIG. 1 is a perspective drawing of an optical element.

FIG. 1 is a perspective drawing of an optical element, and more particularly an optical lens according to an embodiment, more particularly a supporting structure 101 which has a thickness 122 in the range 200-800 micrometer. The supporting structure has an internal sidewall 112 facing the optical axis 110. The FIG. furthermore shows a bendable transparent cover member 102 (which in the present embodiment is glass), a bottom electrode 103 for the one or more actuators (which are piezoelectric actuators), a piezoelectrically active material 104, a top electrode 105 (for the one or more piezoelectric actuators). The supporting structure comprises a support element 126, where the support element 126 being a silicon element, and a structural element 128, where the structural element 128 is an epoxy element. All of the structural element 128 is placed closer to the optical axis than the support element 126, and the structural element 128 is adjoining both the support element 126, and the bendable cover member 102. The support element 126 has a width 124 in the range 100-500 micrometer. It may be understood, that the position of the one or more piezoelectric actuators as observed in a top-view (along a direction parallel with the optical axis) is defined as positions wherein there is an overlap between all of the bottom electrode 103, the piezoelectrically active layer 104 and the top electrode 105 (note that only in these positions can the piezoelectrically active layer be actuated). The figure furthermore shows a transparent deformable lens body 107 (which in the present embodiment is a polymer), a transparent back window 106 (attached to the lens body 107), a cavity 108 inside the supporting structure 101 (which cavity 108 comprises the optical axis 110 and is bounded in a direction away from the optical axis 110 by the sidewall 112), an inner edge 109 of the supporting structure 101 (at the interface between the supporting structure 101 and the bendable transparent cover member 102) projected to the surface of the bottom electrode 103 or to the surface of the top electrode 105. In the presently shown embodiment, it can be seen that an outer edge of the one or more piezoelectric actuators 103, 104, 105 (which in the present embodiment is a single piezolectric actuator which may be defined as the area where all of the bottom electrode 103, piezoelectrically active material 104 and top electrode 105 are overlapping as observed in a direction being parallel with the optical axis) forms a closed ring completely encircling the optical axis 110 and optical aperture 111).

Figure 2:
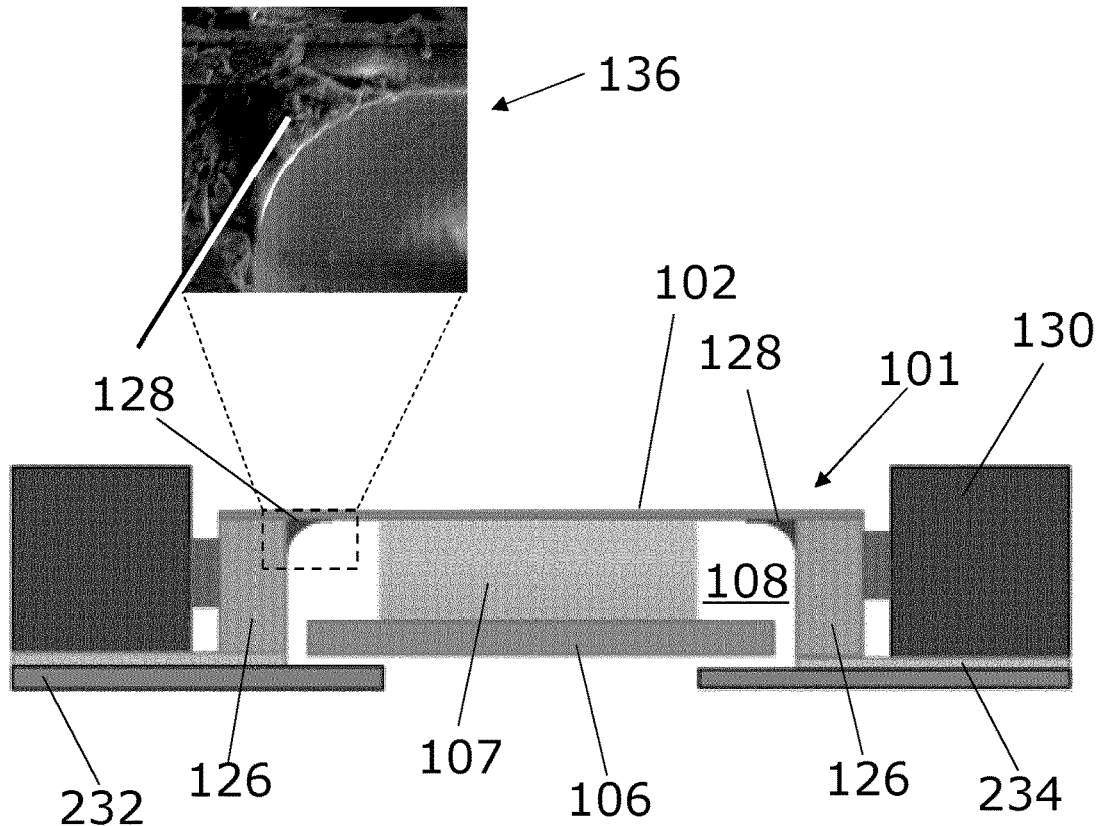
FIG. 2 is a side-view of an optical element.

FIG. 2 is a side-view of an optical element similar to the optical element in FIG. 1. FIG. 2 furthermore displays a moulded package 130, a soft object side cap ("blacksheet") 232, and an adhesive 234. The figure furthermore shows an insert 136 with a microscopy image (from a scanning electron microscope (SEM)) of cross-sectional view of a structural element 128, which is an epoxy, which has been placed in the corner between cover member 102 (glass) and support element 126 (silicon) via wetting and/or capillary forces. Both the schematic part of FIG. 2 and the insert in FIG. 2 shows the rounded part of the structural element (i.e., the part which is not adjoining neither cover member 102 nor support element 126).

Figure 3:
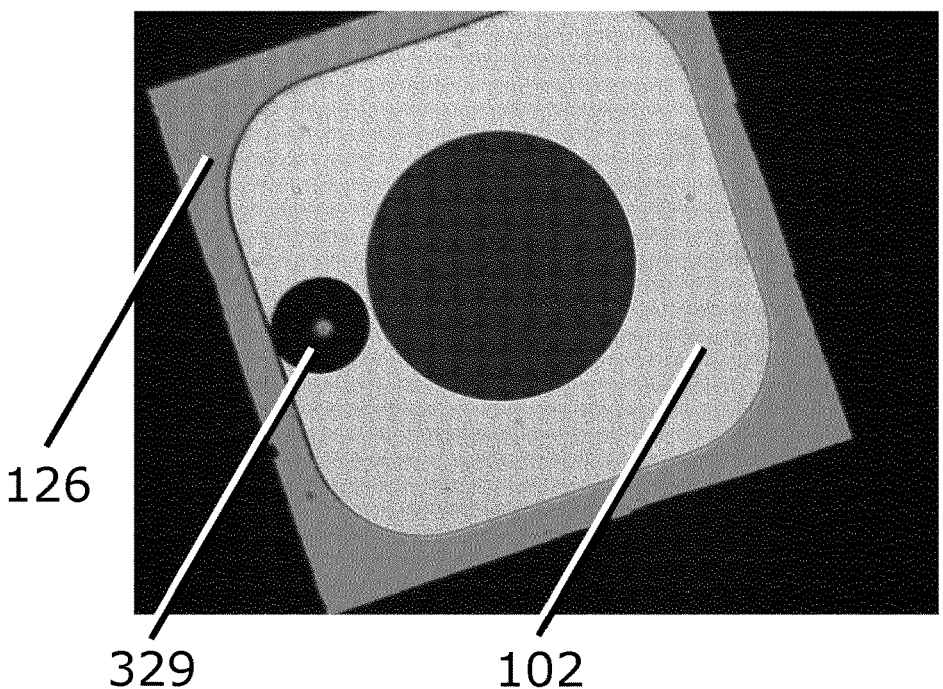
FIG. 3 is a microscope image of a bottom view of an optical element during a method of manufacturing.

FIG. 3 is a microscope image of a bottom view of an optical element during a method of manufacturing, more particularly during providing a structural element. The figure shows a bottom view, i.e., as observed from a point in the optical axis from the bottom (i.e., below the optical element in FIG. 2). The figure shows a liquid structural element material 329 at the bendable cover member 102. The liquid structural element material is applied so that it touches the inner edge of the interface between cover member 102 and support element 126. The liquid structural element material 329 may from its presently shown droplet form be redistributed via adhesive forces between on the one side the liquid structural element and on the other side the support element 126 and the bendable cover member 102. More particularly, it may be drawn around the inner edge interface between cover member 102 and support element 126 and thus be redistributed to be positioned around the entire sidewall of the support element 126 and fill the corner between the support element 126 and the cover member 102 so as to completely (360 degrees) encircle the optical axis (being orthogonal to the plane of the paper and centred in the black circle in the middle of the image) of the optical element.

Figure 4:
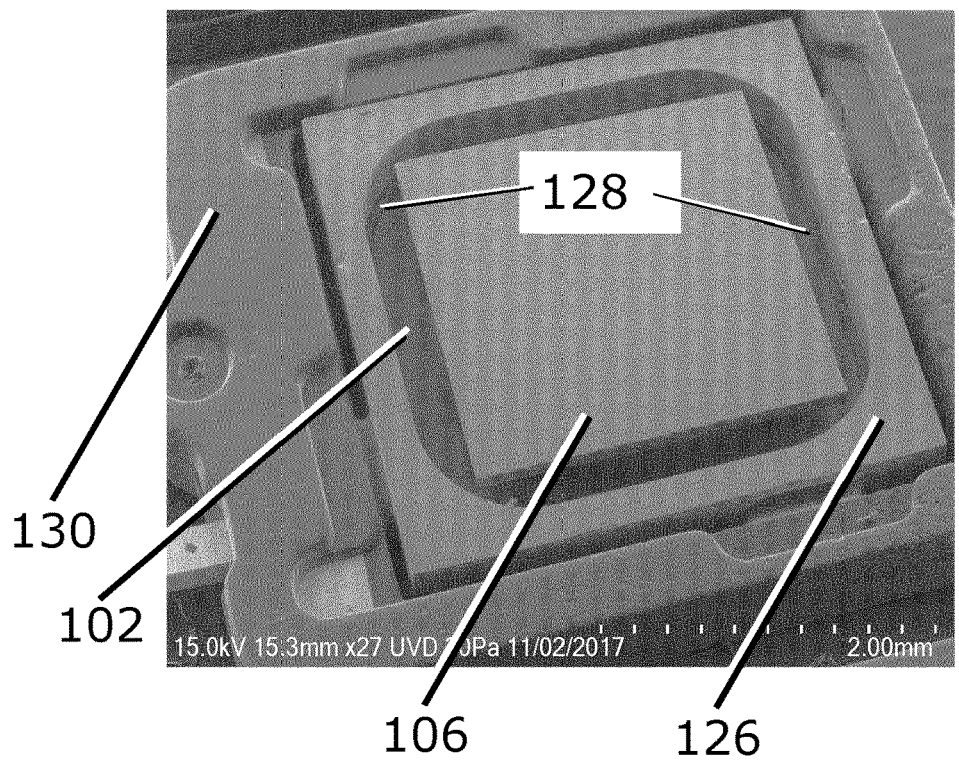
FIG. 4 shows a microscope (SEM) image of a perspective view from a backside of an optical element as schematically shown in FIGS. 1-2.

FIG. 4 shows a microscope (SEM) image of a perspective view from a backside of an optical element as schematically shown in FIGS. 1-2. The structural element 128 can be seen in the corner between cover member 102 and (inner sidewall of the) support element 126.

In the specific embodiment of FIGS. 3-4, a two-component epoxy with a viscosity around 5000 cPs (centipoise) and a storage modulus after curing of 3 GPa was used (these data being according to information from the producer datasheet, where the specific Epoxy used is "EPO-TEK® 353ND from the company Epoxy Technology, Inc., Billerica, US). Approximately 0.2 µl (⅕ microliter) of the liquid structural element material 329 (such as the structural element 128 Epoxy material pre-curing) was dispensed using standard dispensing equipment with a small syringe tip. The droplet of liquid structural element material 329 was placed onto the bendable membrane 102 (being a glass membrane) inside the cavity, such as encircled by the support element 126. After a short time, the liquid droplet spreads and touches the internal sidewall of the support element 126 (cf., internal sidewall 112 in FIG. 1) facing the optical axis 110, which in the present embodiment is a silicon wall, and quickly starts to flow around the inner edge of the the internal sidewall of the support element 126, such as around the optical axis at the inner edge of the interface between the bendable cover member 102 and the support element 126, by capillary forces. The liquid structural element material 329 is thus redistributed via adhesive forces between the liquid structural element and the support element 126, and the bendable cover member 102 beyond the position where it is placed (such as redistributed from the position of contact between the originally placed droplet shown in FIG. 3 to the position of the structural element 128 shown in FIG. 4).

The optical element with the liquid structural element material 329, such as the liquid epoxy, was then placed in an oven for curing at 120° C. for 2 hours.

After curing, a uniformly shaped ring of the hardened epoxy had been formed. The width (i.e., dimension in a direction being orthogonal to the optical axis) of the structural element, such as the epoxy ring, was measured to be approximately 50-70 μm (micrometer).

Several samples were prepared following the same procedure, and were further used for assembly as optical elements, such as tunable optical lenses. The optical performance of the lenses was subsequently characterized, all showed excellent performance. Further, the lenses were mounted in jigs and drop tests carried out according to normal practice for mobile phone camera modules. 90% of these optical lenses were found to pass drop from 150 cm.

Figure 5:
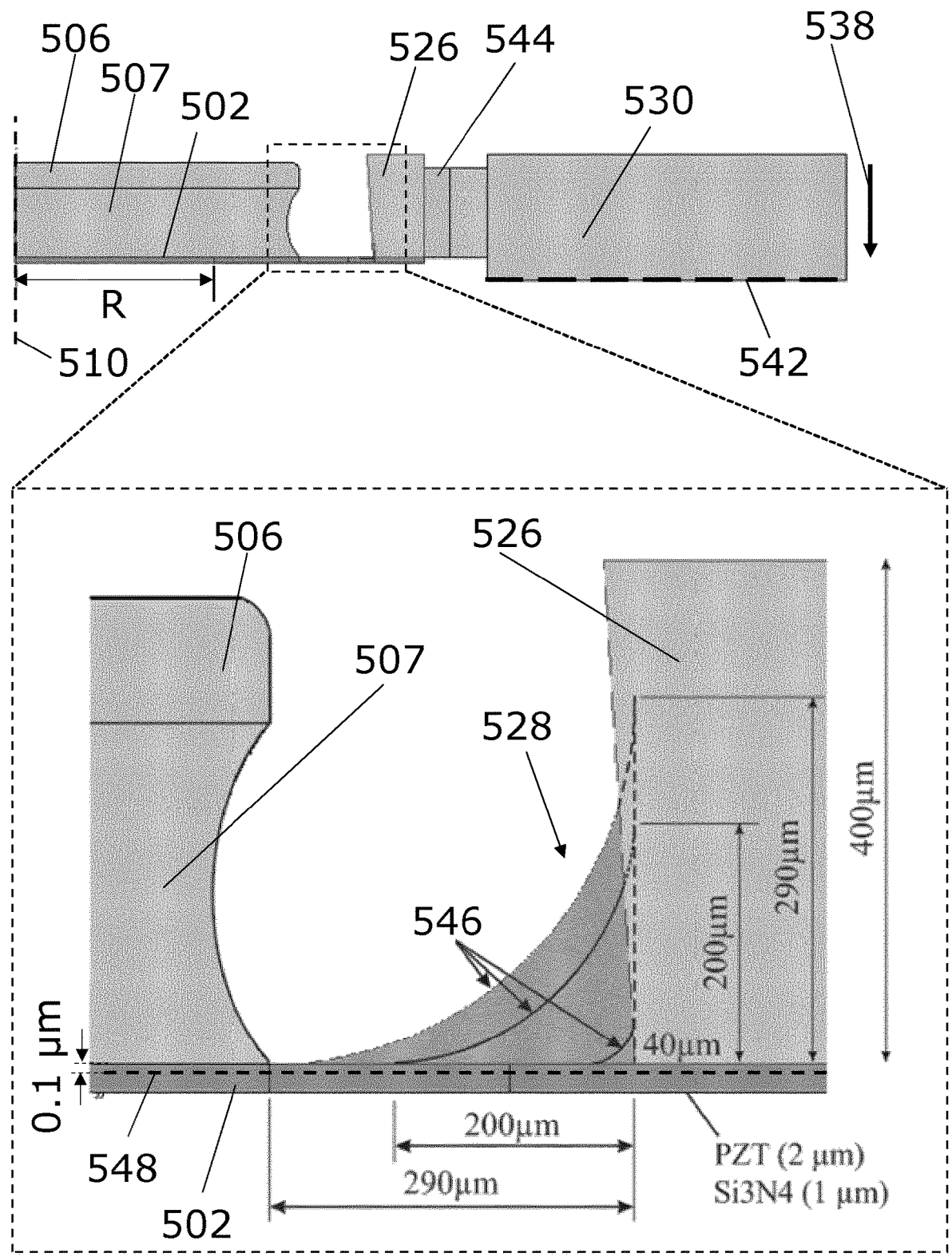
FIG. 5 illustrates a simulation model of the optical element.

FIG. 5 illustrates a simulation model of the optical element. The illustration in the upper portion of the figure shows half of the optical element upside down (with respect to, e.g., FIG. 2), but otherwise the reference signs corresponds to corresponding elements, more particularly optical axis 510, cover member 502, support element 526, the structural element 528, transparent deformable lens body 507, transparent back window 506 and moulded package 530. There is also shown a package glue 544. The simulation corresponds to a drop test for a simplified axisymmetric model. The drop height was h=1 m. The bendable cover member 502 comprises, such as consists of, borophosphosilicate glass (BPSG) with a thickness (dimension parallel with the optical axis) of 20 μm, covered with the PZT film (2 μm thick) and Si3N4 film (1 μm thick). Both PZT and Si3N4 films had a round hole in the centre of 1.55 mm diameter (the aperture). Stress in the $Si_3N_4$ film was adjusted to −120 MPa to obtain the offset −2.7 dpt (where 'dpt' is an abbreviation of dioptres). The double arrow indicating half the diameter R=½*1.55 mm (i.e., the radius R=0.5*1.55 mm) of the optical aperture covers the distance from the optical axis in the left side to the opaque piezo-film in the right side. Arrow 538 indicates velocity (i.e., direction) at the impact. Velocity at the boundary 542 indicated with a thick dashed line was changed from $V_{max}$=4.427 m/s to 0 m/s during impact time. The zoom in the lower part of the figure shows some of the same elements as in the upper part of the figure and additionally indicates dimensions in micrometers. It is in particular noted, that simulations are carried out for three different dimensions of the structural element 528, where the edges 546 are shown. More particularly, the following dimensions of the epoxy cross-section were simulated: 40 μm×40 μm, 200 μm×200 μm, 290 μm×290 μm. The piezoelectric material is lead zirconate titanate (PZT). The structural element 528 is epoxy. The dotted line 548 indicates a line for which the stress is calculated in the cover member (see FIG. 6), which line is 0.1 μm from the side facing the polymer lens body, the epoxy structural element and the support element.

Figure 6:
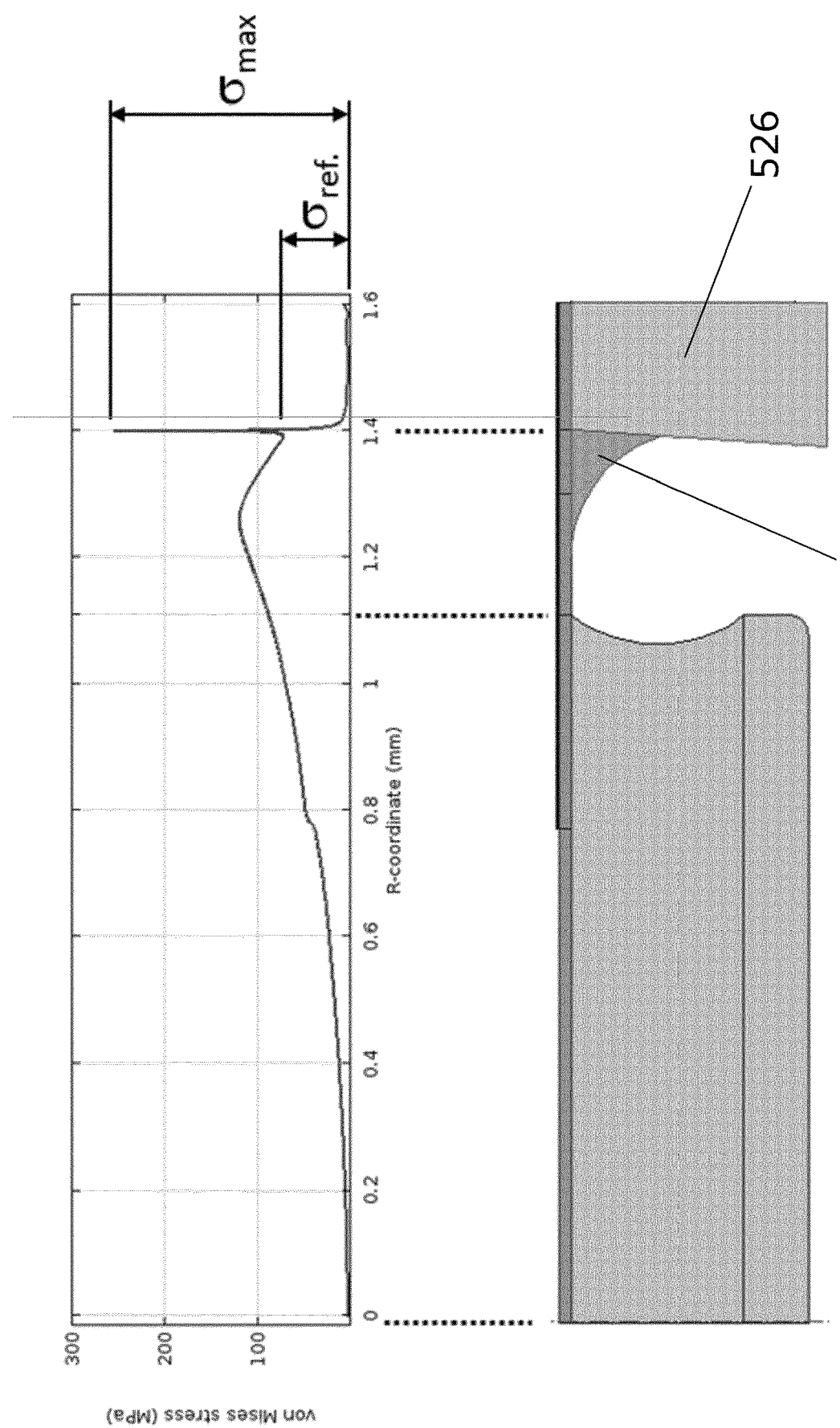
FIG. 6 shows a figure illustrating the stress singularity issue.

FIG. 6 shows a figure illustrating the stress singularity issue, i.e., that the abrupt change in mechanical properties at the interface between the support element 526 and structural element 528 results in a peak stress value (with maximum $\sigma_{max}$) in the bendable cover member upon impact (which is substantially above a reference value $\sigma_{ref}$). The graph shows Von Mises Stress (in units of MPa) on the y-axis (which spans 0-300 MPa) and the spatial coordinate from the optical axis and spans 0 mm to 1.6 mm from left to right. The stress is shown for a line in the cover member 0.1 μm from the side facing the polymer lens body, the epoxy structural element and the support element (see line 548 in FIG. 5).

FIGS. 7-11 show simulation results corresponding to the simulation model described in FIGS. 5-6. The x-axis shows Young's modulus of the epoxy structural element 528 at the cavity inner edge (in gigapascal (GPa)) on a logarithmic scale from 0.01 to 1000 GPa (in FIG. 7) or from 0.01 to 100 GPa (in FIGS. 8-11). In all curves in FIGS. 7-11, the Young's modulus value of 3.5 GPa (which is a realistic value for, e.g., epoxy) is indicated with a vertical dotted line.

Figure 7:
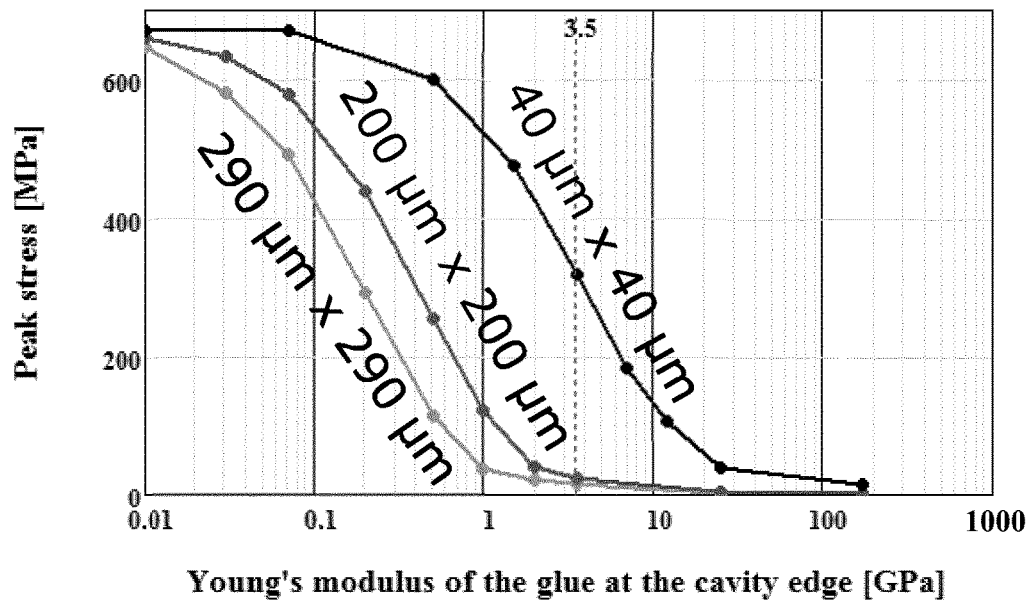
FIGS. 7-11 show simulation results corresponding to the simulation model described in FIGS. 5-6.

FIG. 7 shows the peak stress $\sigma_{max}$ at the cavity edge, i.e., the stress in the bendable cover member 0.1 μm above the lower surface of the bendable cover member (i.e., above the surface facing the support element) at the position of the edge of the support element facing the optical axis ($\sigma_{max}$ in FIG. 6). The y-axis shows peak stress (in megapascal (MPa)). The figure shows that the peak stress can be reduced and the amount of reduction increases with increasing dimensions of the epoxy structural element and with the Young's modulus of the epoxy structural element (for the values shown). The graph shows that peak stress in the cover member (glass) at the cavity edge (sidewall) can be substantially or completely suppressed for the Young's modulus of glue E=3.5 GPa. The stress concentration factor can also be reduced by several times.

In each of FIGS. 8-11, there are three curves which correspond to, respectively, dimensions of the structural element of 40 μm×40 μm (dotted curve with open circle markers), 200 μm×200 μm (dashed curve with filled circle markers), 290 μm×290 μm (full drawn curve with closed circle markers).

Figure 8:
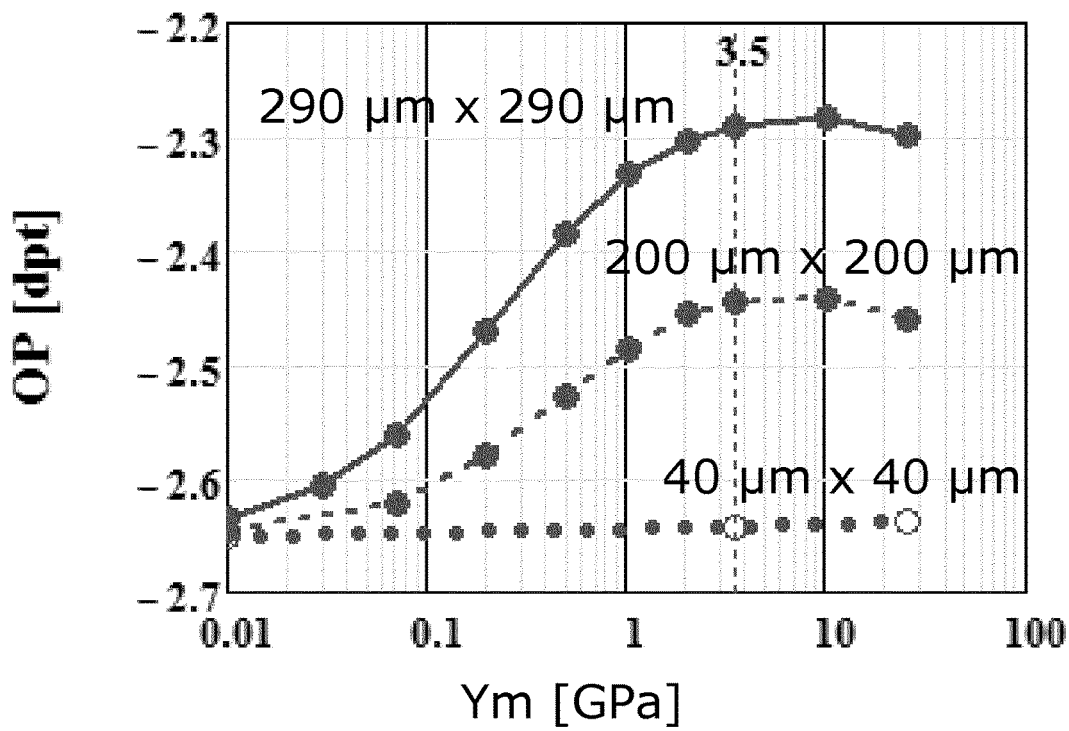
Figure 9:
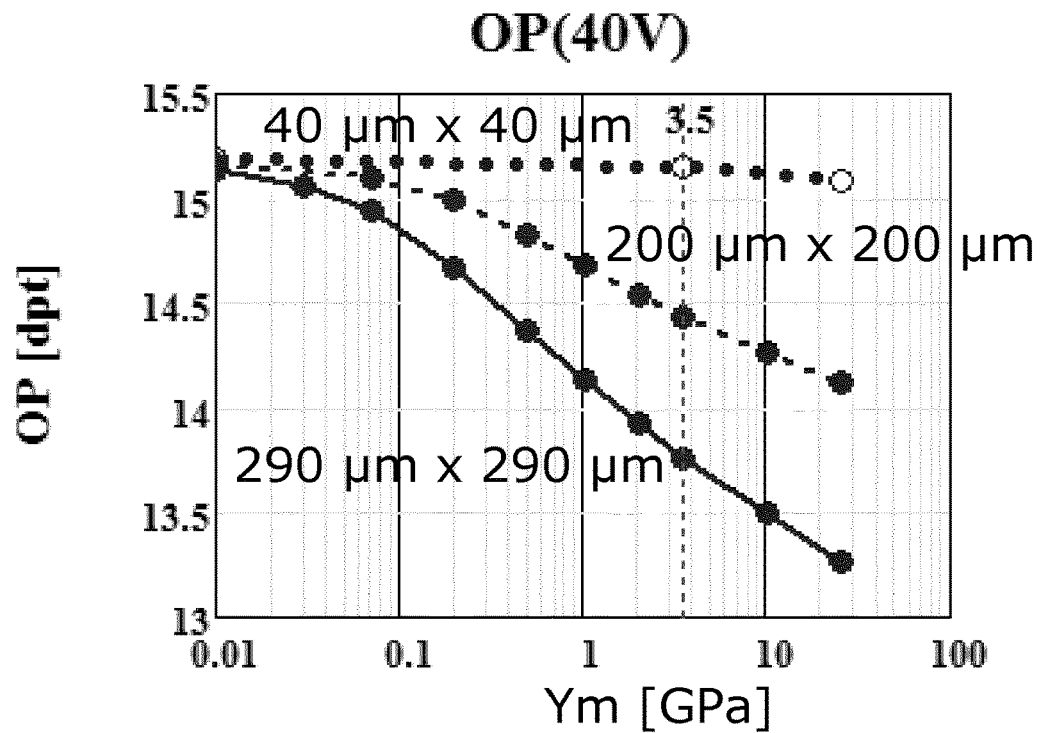
Figure 10:
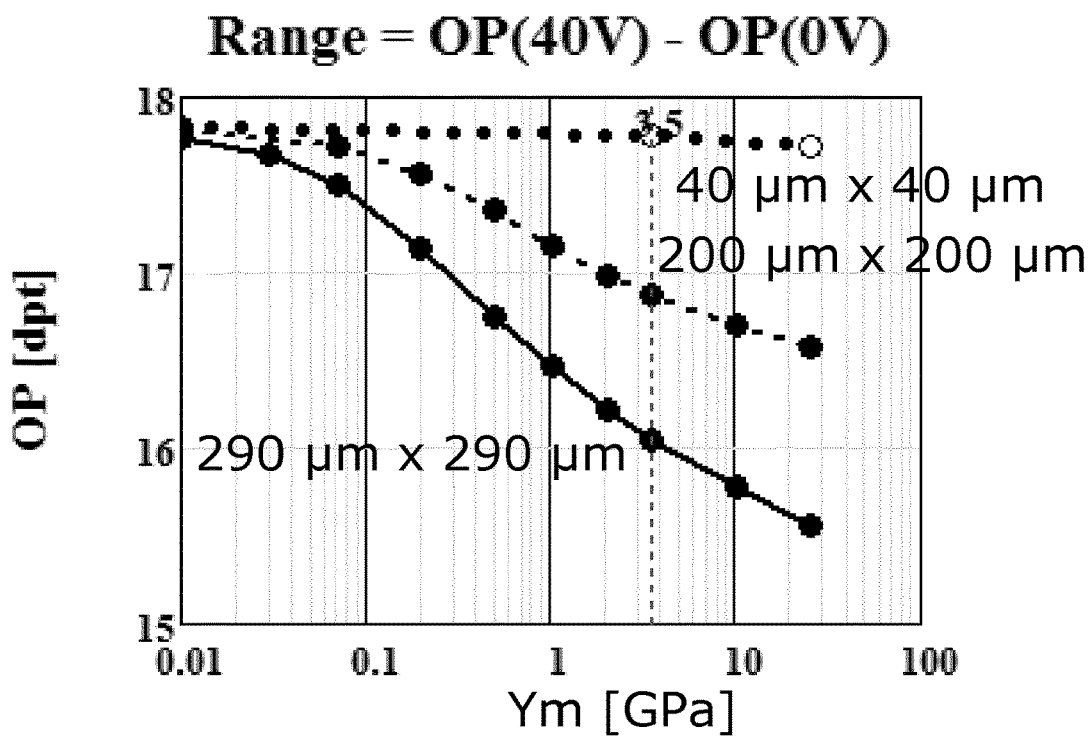

FIGS. 8-10 have a y-axis showing optical power (OP) in units of dioptres (dpt).

FIG. 8 shows the optical power (OP) as a function of Young's modulus (Ym) for an applied (realistic) voltage across piezoelectric actuators of 0 volts.

FIG. 9 shows the optical power (OP) as a function of Young's modulus (Ym) for an applied (realistic) voltage across piezoelectric actuators of 40 volts.

FIG. 10 shows the optical power difference corresponding to the voltage difference 0-40 V as a function of Young's modulus. It can be seen that optical power span of 15 dioptres or more are achieved for all the shown configurations.

Figure 11:
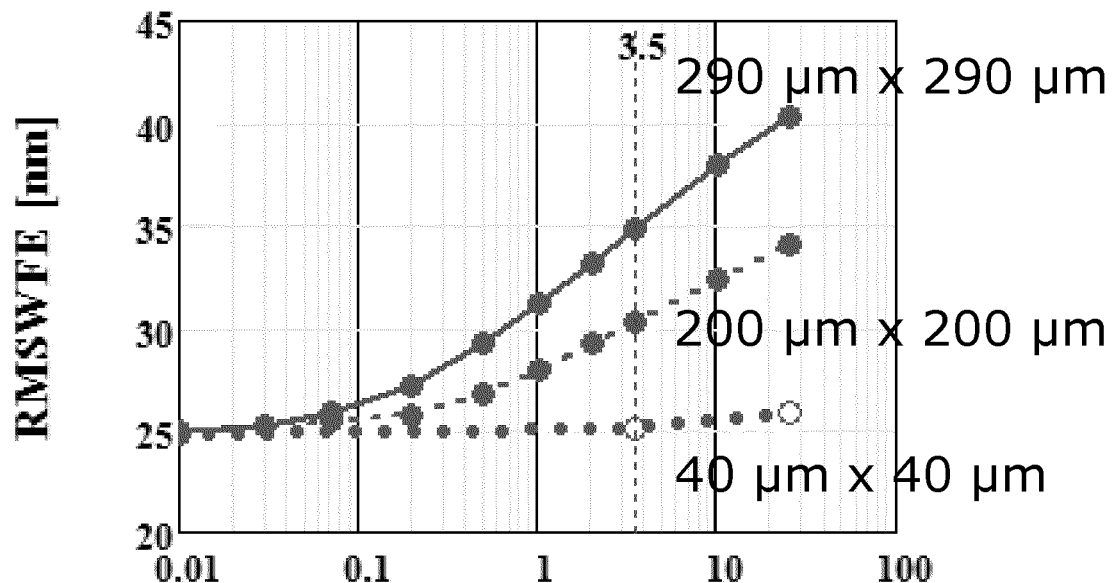

FIG. 11 have an y-axis showing root-mean-square wavefront error ($RMS_{WFE}$) in nanometers (nm). FIG. 11 shows root-mean-square wavefront error as a function of Young's modulus of the structural element. It can be seen that said root-mean-square wavefront error is kept at or below 50 nm for all configurations shown and may even be kept below 30 nm for all dimensions for sufficiently low Young's modulus values and for the smallest shown dimension throughout the shown Young's modulus range.

Figure 12:
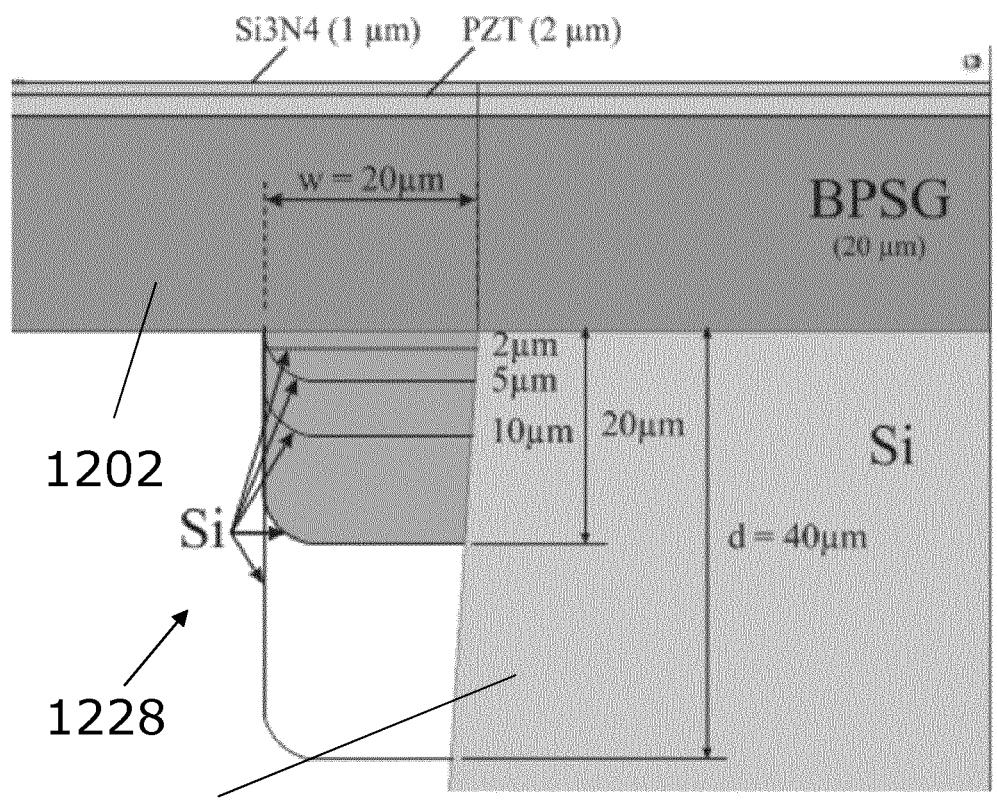
FIGS. 12-14 show alternative embodiments where the supporting structure is made of silicon.
Figure 13:
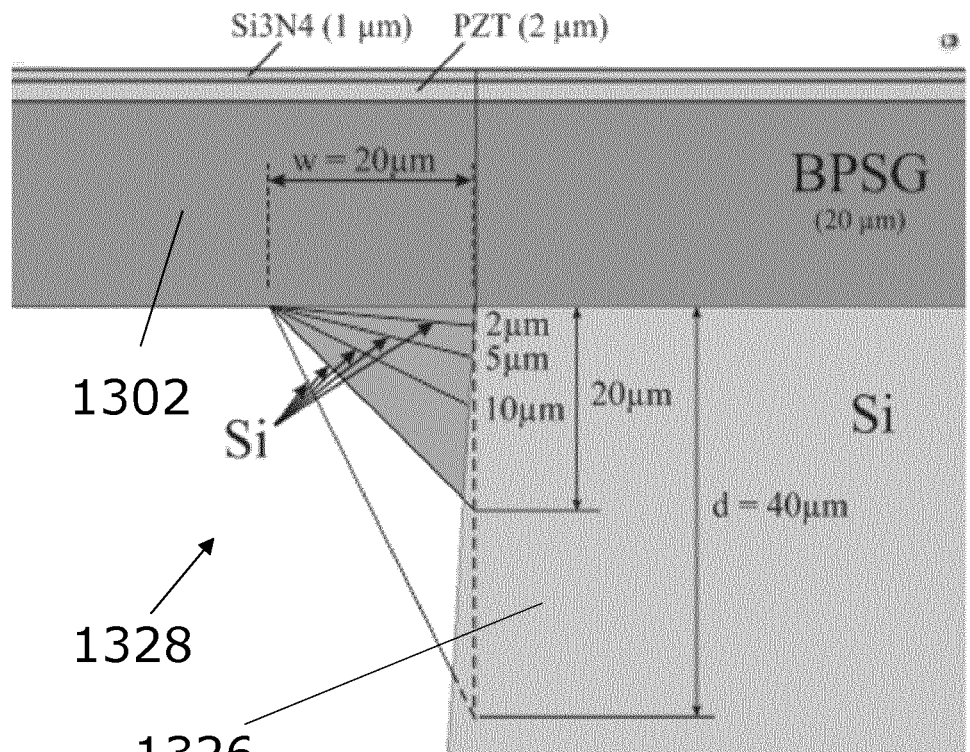
Figure 14:
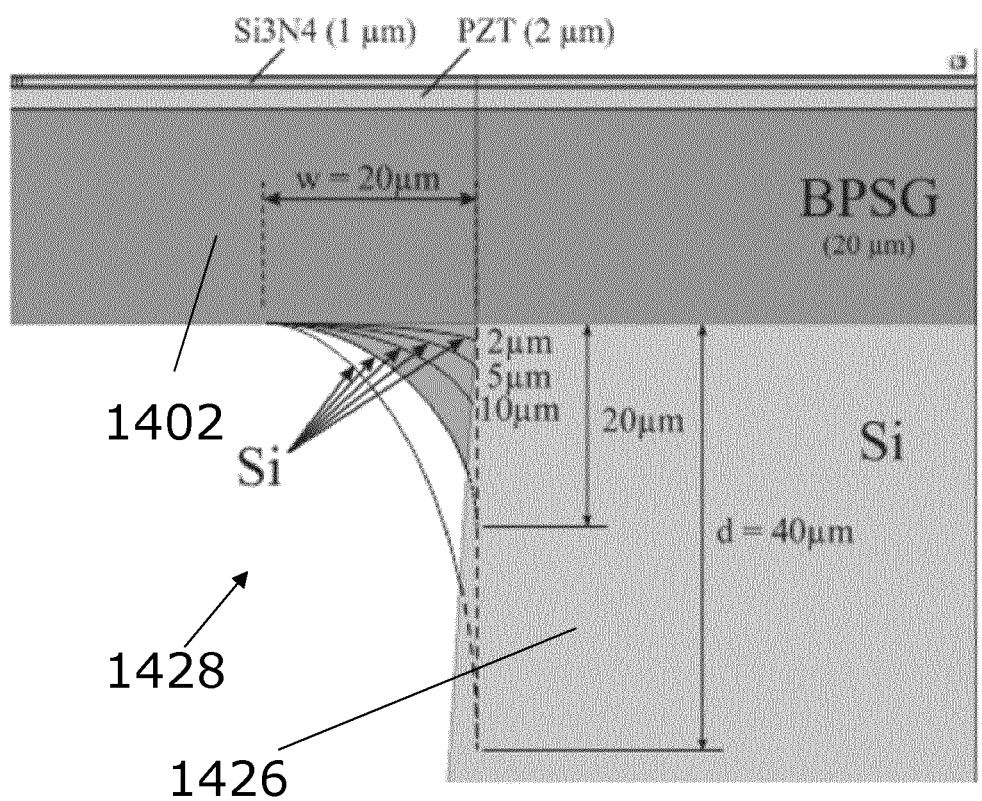

FIGS. 12-14 show alternative embodiments where the supporting structure is made of silicon. It may be seen that whereas FIGS. 1-11 related to an optical element with a supporting structure comprising a support element 1226 of silicon (Si) and a structural element 1228 of another material (such as epoxy), each of the embodiments of FIGS. 12-14 comprises a supporting structure where a first (main) portion 1226, 1326, 1426 corresponds to the support element of the embodiments of FIGS. 1-11 and a second (protruding) portion 1228, 1328, 1428 corresponds to the structural elements of the embodiments of FIGS. 1-11 and where each of the first portion and the second portion are made of the same material (silicon), optionally in a monolithic structure. Each of FIGS. 12-14 discloses a supporting structure with a main portion 1226, 1326, 1426 on the right hand side of silicon (Si) and a protruding portion 1228, 1328, 1428 on the left hand side of silicon (Si). The protruding portion in each of FIGS. 12-14 have widths w (dimension in radial direction, i.e., orthogonal to optical axis) of 20 μm (which in other embodiments is 40 μm) and thicknesses d (dimension in parallel to optical axis) of 2 μm, 5 μm, 10 μm, 20 μm or 40 μm. The figures also show a cover member of borophosphosilicate glass (BPSG) which is 20 μm thick. On top of the cover member there is placed a 2 μm thick layer of the piezoelectric material is lead zirconate titanate (PZT) and on top of that there is placed 1 μm $Si_3N_4$ with hole of 1.55 mm diameter in both.

In FIG. 12 the second (protruding) portion 1228 has in a cross-sectional plane comprising the optical axis a substantially rectangular shape, such as a shape corresponding to a rectangle with a rounded corner (where the rounded corner is the corner facing away from both the first (main) portion 1226 and the cover member 1202). In alternative embodiments, the material of the second (protruding) portion 1228 could be other materials than silicon, it could for example be $SiO_2$. In alternative embodiments, the material of the second (protruding) portion 1228 could be similar to a material placed between the first (main) portion 1226 and the cover member 1202.

In FIG. 13 the second (protruding) portion 1328 has in a cross-sectional plane comprising the optical axis a substantially triangular shape, such as a triangular shape, such as a shape with straight sides parallel with a side of the first (main) portion 1326 and a side of the cover member 1302 and a (last) straight side.

In FIG. 14 the second (protruding) portion 1428 has in a cross-sectional plane comprising the optical axis a substantially triangular shape albeit with one curved side, such as a shape with straight sides parallel with a side of the first (main) portion 1426 and a side of the cover member 1402 and a (last) side being curved, such as being concave as observed from outside the triangle.

An embodiment according to FIG. 12 can be manufactured by standard bulk micromachining techniques with two-step deep dry silicon etching from the back side of the wafer.

Embodiments according to FIGS. 13 and 14 can be manufactured by standard bulk micromachining techniques with two-step back side silicon etching. A first deep dry silicon etching step is used to remove the main part of the bulk silicon. In case of the embodiment shown in FIG. 13, this first deep dry silicon etching step is followed by anisotropic wet etching, which removes silicon preferentially in the <100> plane and produces the characteristic sloped sidewalls shown in FIG. 13. In case of the embodiment shown in FIG. 14, the first deep dry silicon etching step is followed by isotropic etching, either wet or dry, which produces the rounded profile shown in FIG. 14.

FIG. 15 shows simulation results for three simulation models corresponding to FIGS. 12-14. The x-axis shows thickness d of the second (protruding) portions 1228, 1328, 1428 in micrometer (μm). The y-axis shows stress in megapascal (MPa). The three curves 1550, 1552, 1554 which on the right hand side are on the top represent (from the top) peak stress in the cover member 1202 (cf., $\sigma_{max}$ in FIG. 6) at a position above the interface between first (main) portion 1226 and second (protruding) portion 1228 (curve 1550), peak stress in the cover member 1302 (cf., $\sigma_{max}$ in FIG. 6) at a position above the interface between first (main) portion 1326 and second (protruding) portion 1328 (curve 1552) and peak stress in the cover member 1402 (cf., $\sigma_{max}$ in FIG. 6) at a position above the interface between first (main) portion 1426 and second (protruding) portion 1428 (curve 1554). The three curves 1556, 1558, 1560 which on the left hand side are on the top represent peak stress in the cover member 1202, 1302, 1402 at a position above a point of the second (protruding) portion 1228, 1328, 1428, which is closest to the optical axis (i.e., the most left hand point of the second (protruding) portion 1228, 1328, 1428 in FIGS. 12-14). These curves 1556, 1558, 1560 go towards 518 MPa for thickness d going towards zero (μm). The little inserted figures with shapes corresponding to the shape of the structural element, which the curves represent, have a little star indicating the position of the peak stress.

Figure 17:
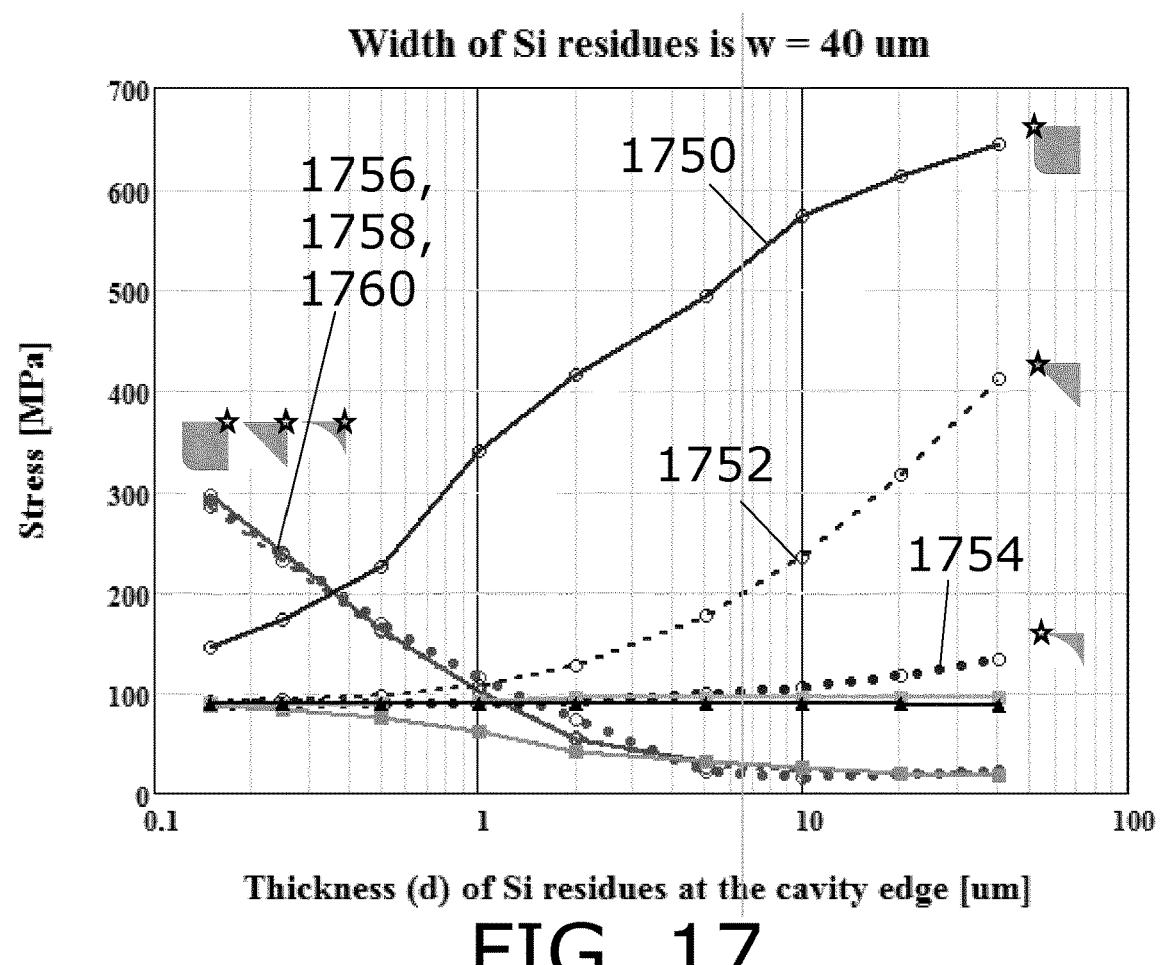
FIG. 17 shows simulation results similar to FIG. 15 for three simulation models corresponding to FIGS. 12-14 for a width of the Si structural element being 40 µm.

FIG. 16 comprises a legend of the curves of FIGS. 15, 17. The legend of FIG. 16 also applies to FIG. 26 when the Si residues is replaced with Epoxy material for the structural element 128.

FIG. 17 shows simulation results similar to FIG. 15 for three simulation models corresponding to FIGS. 12-14 albeit where widths d of the second (protruding) portions 1228, 1328, 1428 are 40 μm. The three curves 1750, 1752, 1754 which on the right hand side are on the top represent (from the top) peak stress in the cover member 1202 (cf., FIG. 6) at a position above the interface between first (main) portion 1226 and second (protruding) portion 1228 (curve 1750), peak stress in the cover member 1302 (cf., FIG. 6) at a position above the interface between first (main) portion 1326 and second (protruding) portion 1328 (curve 1752) and peak stress in the cover member 1402 (cf., FIG. 6) at a position above the interface between first (main) portion 1426 and second (protruding) portion 1428 (curve 1754). The three curves 1756, 1758, 1760 which on the left hand side are on the top represent peak stress in the cover member 1202, 1302, 1402 at a position above a point of the second (protruding) portion 1228, 1328, 1428, which is closest to the optical axis (i.e., the most left hand point of the second (protruding) portion 1228, 1328, 1428 in FIGS. 12-14). These curves 1756, 1758, 1760 go towards 518 MPa for thickness d going towards zero (μm). The little inserted figures with shapes corresponding to the shape of the structural element, which the curves represent, have a little star indicating the position of the peak stress.

Figure 26:
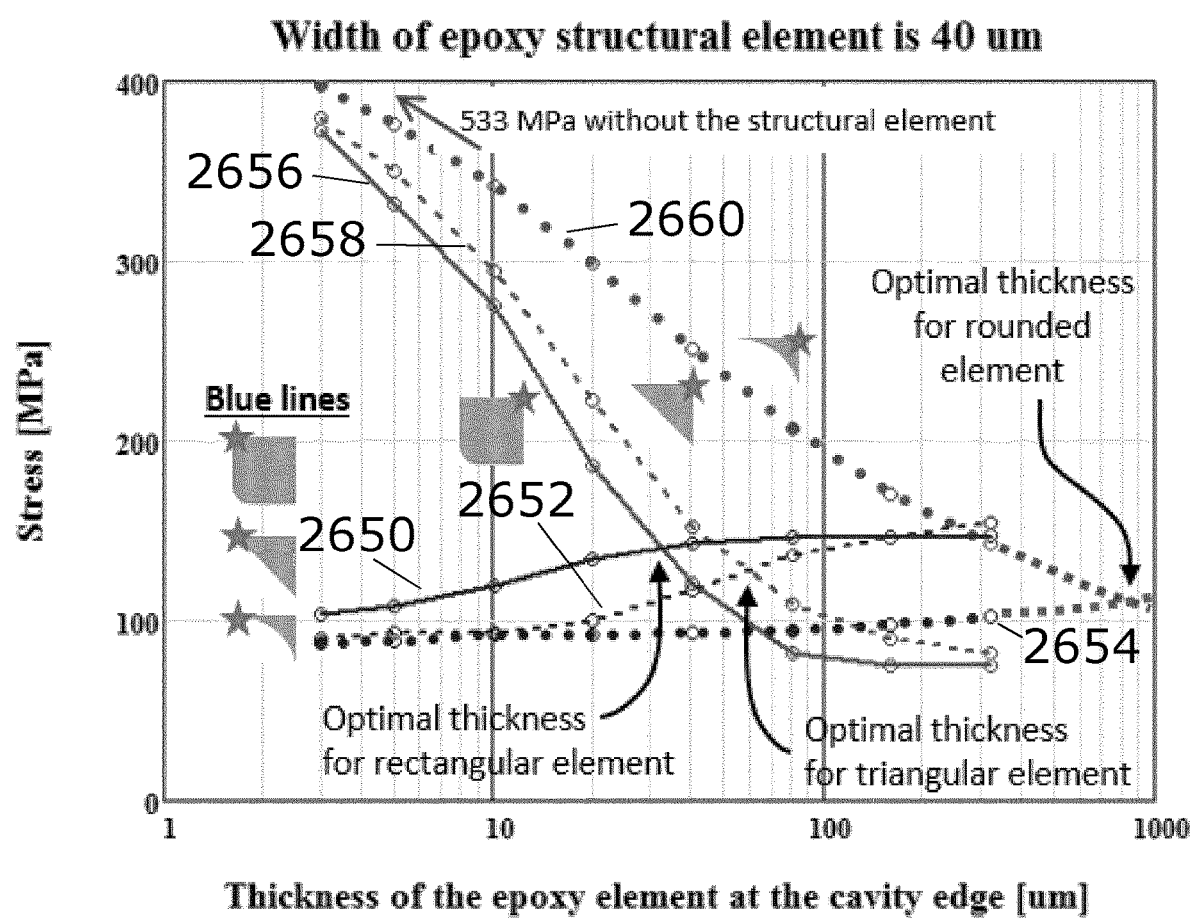
FIG. 26 shows simulation results similar to FIG. 15 for three simulation models with use of Epoxy for the structural element

FIG. 26 shows simulation results similar to FIGS. 15 and 17 for three simulation models corresponding to FIGS. 12-14 albeit where widths d of the second (protruding) portions 1228, 1328, 1428 are 40 μm, and where the structural element 128, i.e. the (protruding) portions 1228, 1328, 1428 are made from cured Epoxy. The three curves 2650, 2652, 2654 which on the right hand side have the maximum stress values represent (from the top) peak stress in the cover member 1202 (cf., $\sigma_{max}$ in FIG. 6) at a position above the interface between first (main) portion 1226 and second (protruding) portion 1228 (curve 2650), peak stress in the cover member 1302 (cf., $\sigma_{max}$ in FIG. 6) at a position above the interface between first (main) portion 1326 and second (protruding) portion 1328 (curve 2652) and peak stress in the cover member 1402 (cf., $\sigma_{max}$ in FIG. 6) at a position above the interface between first (main) portion 1426 and second (protruding) portion 1428 (curve 2654). The three curves 2656, 2658, 2660 which on the left hand side are on the top represent peak stress in the cover member 1202, 1302, 1402 at a position above a point of the second (protruding) portion 1228, 1328, 1428, which is closest to the optical axis (i.e., the most left hand point of the second (protruding) portion 1228, 1328, 1428 in FIGS. 12-14). These curves 2656, 2658, 2660 go towards 533 MPa for thickness d going towards zero (μm). The little inserted figures with shapes corresponding to the shape of the structural element, which the curves represent, have a little star indicating the position of the peak stress.

From FIGS. 15-17 it can be seen that stress concentration factors (a ratio between peak stress σmax and reference stress $\sigma_{ref}$ in FIG. 6) in the cover member (of BPSG) at the cavity edge (i.e., at the at position above the interface between first (main) portion 1226, 1326, 1426 and second (protruding) portion 1228, 1328, 1428 (curves 1550, 1552, 1554, 1750, 1752, 1754)) and at the inner edge of the second (protruding) portions 1228, 1328, 1428 (i.e., at a position above a point of the second (protruding) portion 1228, 1328, 1428, which is closest to the optical axis, i.e., the most left hand point of the second (protruding) portion 1228, 1328, 1428 (curves 1556, 1558, 1560, 1756, 1758, 1760)) are minimal (such as approximately 1) when the second (protruding) portions have a rounded shape, cf., the embodiment of FIG. 14, with approximately 1:10 ratio of thickness to width, for example:

thickness 2 μm and width 20 μm, or
thickness 4 μm and width 40 μm.

It is furthermore noted that influence of the presence of the second (protruding) portions of embodiments of FIGS. 12-14 on the optical power and root-mean square wavefront error ($WFE_{RMS}$) is negligible (quantitatively, respectively, less than 0.1 diopters and less than 1 nm).

FIG. 26 shows when the second (protruding) portions have a rounded shape, e.g. concave or inwardly curved shape, as shown in FIG. 14, the optimal thickness d is approximately 800 μm, or values above 800 μm. The optimal thickness may be defined as the thickness where the stress levels at the cavity edge (star position to the right, red curves) and the stress levels at the edge of the structural element (star position to the left, blue curves) are approximate equal. Thus, FIG. 26 shows that a significant reduction of stress levels, particularly at the cavity edge (red curves) is possible with use of Epoxy for the structural element 128.

FIG. 26 also shows that the optical thickness for rectangular element is about 30-40 μm, and the optimal thickness for the triangular element is about 60 μm.

It is noted that the concave shape of the surface of the structural element 128 made from Epoxy or other liquid structural element material is obtained as a result of the fluid properties of the material.

Figure 18:
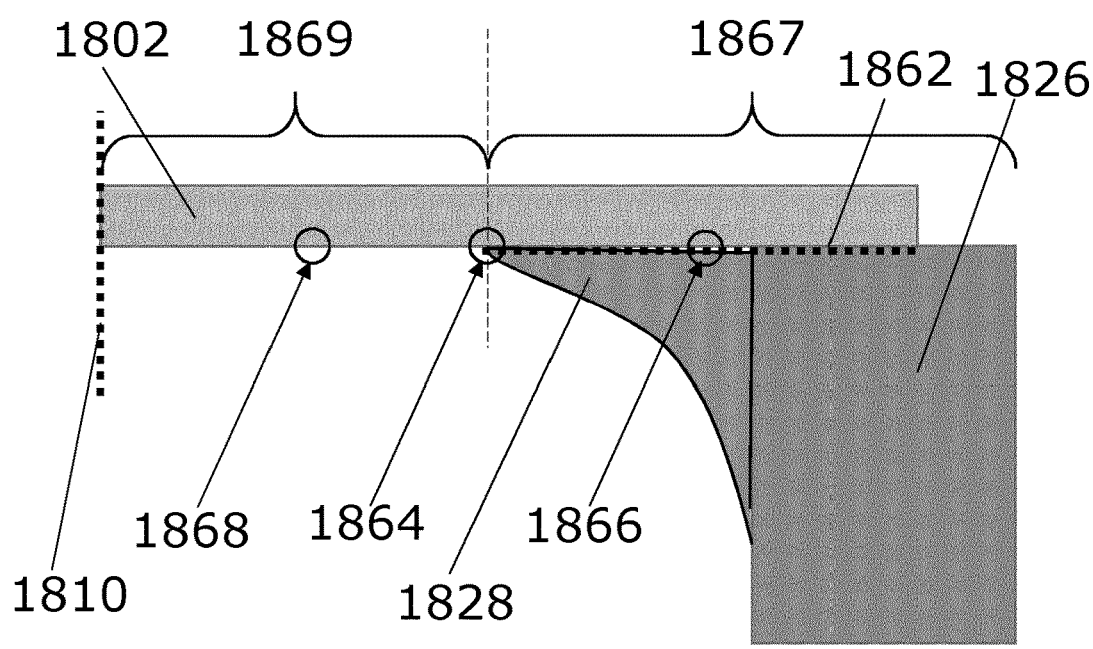
FIG. 18 is a schematic illustrating positions in an optical element.

FIG. 18 shows is a schematic illustrating positions in an optical element. The figure shows an optical axis 1810, a supporting structure comprising a support element 1826 and a structural element 1828, a bendable cover member 1802 attached to the supporting structure, wherein an interface 1862 (as indicated by the horizontal dotted line) between the bendable cover member 1802 and the supporting structure defines an interface plane. The figure furthermore shows a point 1864 at an inner edge of the interface 1862 and a point 1866 more distantly placed with respect to the optical axis (it is noted that this point 1866 could be anywhere in the range indicated by curly bracket 1867). Still further, the figure shows a point 1868 on a line from the point 1864 at an inner edge of the interface to the optical axis 1810 (it is noted that this point 1868 could be anywhere in the range indicated by curly bracket 1869).

Figure 19:
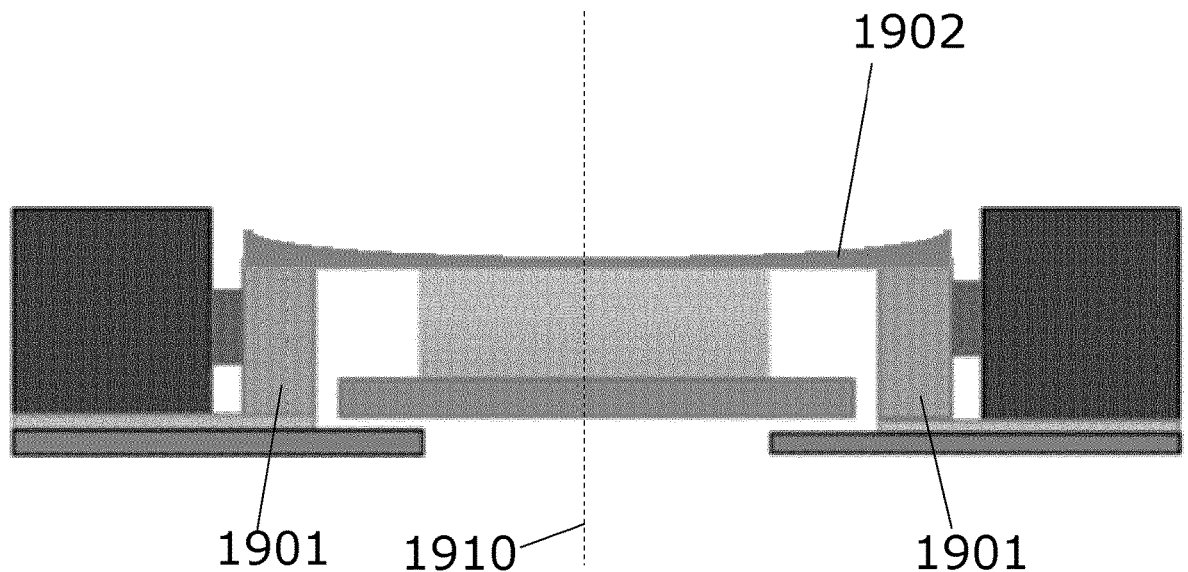
FIG. 19 shows an embodiment.

FIG. 19 shows an embodiment which is similar to the embodiment of FIG. 2, except that it does not have the (protruding) structural elements (which it could have in another embodiment) but instead a dimension of the bendable cover member in a direction being parallel with the optical axis 1902 is larger at at least one first point at an inner edge of the interface between the bendable cover member 1902 and the supporting structure 1901 than at at least one second point on a line from said first point to the optical axis 1910.

It is noted, that in all shown embodiments, the thickness of the structural element, the second (protruding) portion or the cover member, is increasing or constant at any point in a direction outwards from the optical axis, but it is also conceivable and encompassed by the present invention that for at least some (radial) range, the thickness could be decreasing.

Examples of alternative optical lenses are presented below and in FIGS. 20-25.

A first alternative optical lens comprises

A supporting structure 2001,
a bendable cover member 2002 attached to the supporting structure 2001,
one or more actuators arranged for shaping said bendable cover member into a desired shape,
A first element 2074 being more rigid than the bendable cover member 2002 and arranged to encircle the optical axis and being placed on the bendable cover member 2002 on the opposite side (with respect to a direction being parallel with the optical axis) of the bendable cover member 2002 with respect to the supporting structure 2001,
A second element 2072 being an adhesive connecting the first element 2074 and the cover member 2002, the second element 2072 being less rigid than the first element 2074, wherein each of the first element 2074 and the second element 2072 are extending further towards the optical axis than the supporting structure 2001. By 'more rigid' may be understood higher flexural rigidity. This may be achieved with a higher Young's modulus and/or larger thickness (i.e., dimension in a direction parallel with the optical axis).

Figure 20:
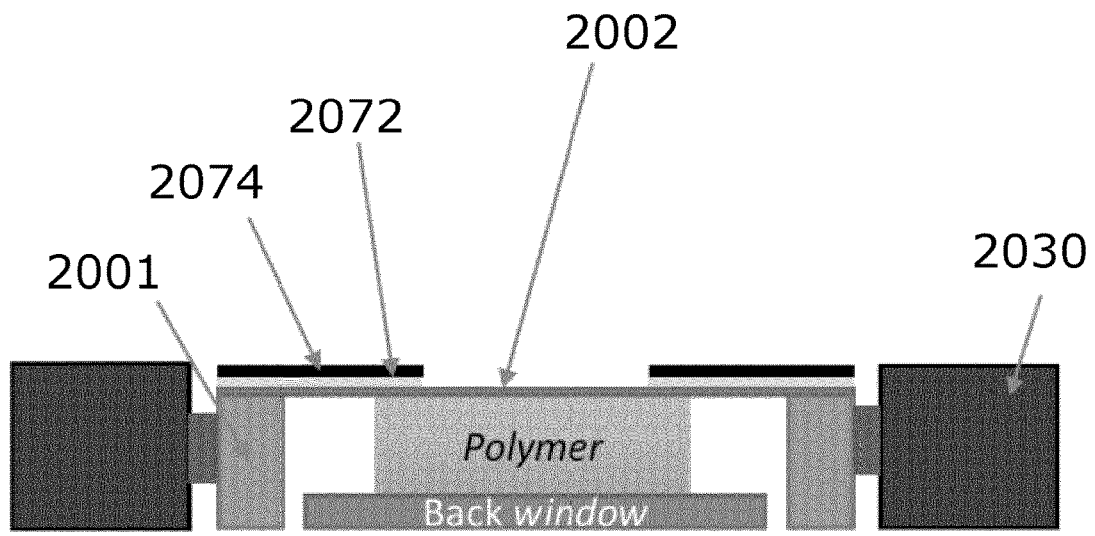
FIGS. 20-25 present examples of alternative optical lenses.

FIG. 20 shows an embodiment of the first alternative optical element which is similar to the embodiment of FIG. 2 (cf., e.g., 'polymer' lens body and back window) except that it does not have the (protruding) structural elements 128 (which it could have in another embodiment) and it does not have neither the soft object side cap ("blacksheet") 232 nor the adhesive 234. Furthermore, in contrast with the embodiment of FIG. 2 the embodiment of FIG. 20 has a first element 2074 ('hard cap') encircling the optical axis and attached to the cover member with a second element 2072 ('hard cap adhesive'). An advantage of the first and second elements are may be that they inhibit excessive movement of the cover member, and thus avoid excessive stress in the cover member at the point of the inner edge of the supporting structure. It is noted that due to the adhesive second element, this effect is achieved in both directions (up/down, i.e., for impacts in both directions along the optical axis). Furthermore, the adhesive second element ensures that the rigid first element is some distance away from the cover member, so as to ensure that a stress singularity issue does not arise at the inner edge of the first element. The second element 2072 can be made of steel (or copper or aluminium) with a thickness in the range 10-1000 micrometer, such as 30-50 micrometer. The second element (which may be a glue) 2072 can be epoxy (or an acrylic or silicone adhesive) with a thickness in the range 10-1000 micrometer with Young's modulus E within 1-100 MPa. The Youngs' modulus of the second element 2072 should preferably not be too stiff to avoid too much influence of the steel plate on optical parameters of the optical lens.

A second alternative optical lens, wherein the optical element is a refractive lens, comprises A supporting structure 2101,
a bendable cover member 2102 attached to the supporting structure 2101,
one or more actuators arranged for shaping said bendable cover member into a desired shape,
at least one deformable transparent lens body 2107 surrounded by a sidewall of the supporting structure 2101 and being attached to the bendable cover member 2102,
a back window 2106 attached to the lens body 2107 on the opposite side (with respect to a direction being parallel with the optical axis) of the lens body 2107 with respect to the bendable cover member 2102,
a first element 2176 being more rigid than the bendable cover member 2102 and arranged to encircle the optical axis and being placed on the supporting structure 2101 on the opposite side (with respect to a direction being parallel with the optical axis) of the supporting structure 2101 with respect to the bendable cover member 2102,
a second element 2178 being an adhesive connecting the first element 2176 with
the supporting structure 2101, and
the back window 2106, the second element 2178 being less rigid than the first element 2176.

Figure 21:
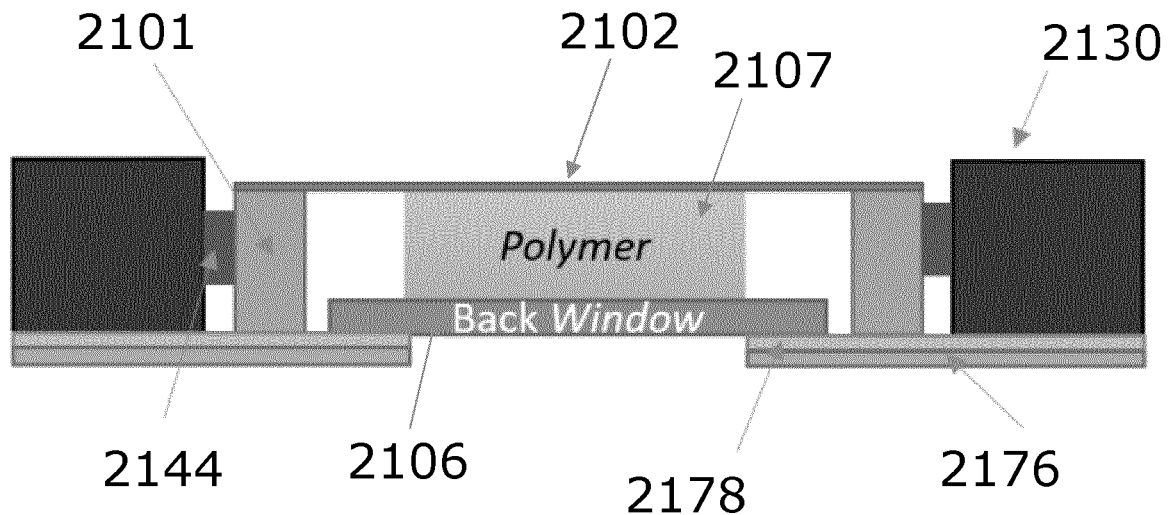

FIG. 21 shows an embodiment of the second alternative optical element which is similar to the embodiment of FIG. 2 (cf., e.g., 'polymer' lens body and back window) except that it does not have the (protruding) structural element 128 (which it could have in another embodiment) and it does not have neither the soft object side cap ("blacksheet") 232 nor the adhesive 234. Furthermore, in contrast with the embodiment of FIG. 2 the embodiment of FIG. 21 has the first element 2176 ('soft cap') and the second element 2178 ('soft cap adhesive'). An advantage of the first and second elements are may be that they inhibit excessive movement of the cover member, and thus avoid excessive stress in the cover member at the point of the inner edge of the supporting structure. It is noted that due to the adhesive second element, this effect is achieved in both directions (up/down, i.e., for impacts in both directions along the optical axis). The first element 2176 can be made of polyimide of thickness 10-1000 micrometer, such as 30-100 micrometer, or any other material with sufficiently low Young's modulus, such as the Young's modulus less than 10 MPa. The second element (which may be a glue) 2178 can be epoxy (or an acrylic or silicone adhesive) with a thickness in the range 10-1000 micrometer with Young's modulus E within 1-100 MPa. The Youngs' modulus of each of the first element 2176 and the second element 2178 should preferably not be too stiff to avoid too much influence on optical parameters of the optical lens. Both second element 2178 and first element 2176 should not be too stiff to avoid too much influence on optical parameters of the TLens.

In a third alternative embodiment (which is somewhat similar to the second alternative embodiment), the back window is attached to a rigid frame (such as the supporting structure) by dispensed glue.

In fourth, fifth and sixth alternative optical lenses there may be provided mechanical structure(s) located at a controlled distance from the moving cover member and/or back window. The mechanical structure(s) are provided in a ring-shape so as to enable encircling the optical axis without inhibiting the light path.

A fourth alternative optical lens comprises

A supporting structure 2201,
a bendable cover member 2202 attached to the supporting structure 2201,
one or more actuators arranged for shaping said bendable cover member into a desired shape,
A first element 2272 being more rigid than the bendable cover member 2202 and arranged to encircle the optical axis and being placed on the bendable cover member 2202 on the opposite side (with respect to a direction being parallel with the optical axis) of the bendable cover member 2202 with respect to the supporting structure 2201,
A second element 2274 being an adhesive connecting the first element 2272 and the cover member 2202, the second element 2274 being less rigid than the first element 2272,
A third element 2280 being more rigid than the bendable cover member 2202 and arranged to encircle the optical axis and being placed on the supporting structure 2201 or an element connected to the supporting structure,
A fourth element 2282 being an adhesive connecting the third element 2280 and
the supporting structure 2201 or
an element 2230 connected to the supporting structure, the fourth element 2282 being less rigid than the first element 2280, wherein
the first element 2272 is extending further towards the optical axis than each of the supporting structure 2201 and the second element 2274, such as and wherein the first element 2272 and the second element 2274 are being placed so as to inhibit motion of the cover member 2202 in at least one direction along the optical axis, and wherein
the third element 2280 and the fourth element 2282 are being placed so as to inhibit motion of the back window upon impact, such as an impact with an acceleration/deceleration of 5000-20000 g, i.e., 5-20 kg (where 'kg' refers to a kilo (thousand) 'g', where one 'g' corresponds approximately to the acceleration due to gravity at the Earth's surface and is the standard gravity, defined as 9.80665 metres per second squared or equivalently 9.80665 newton's of force per kilogram of mass), in at least one direction along the optical axis.

Figure 22:
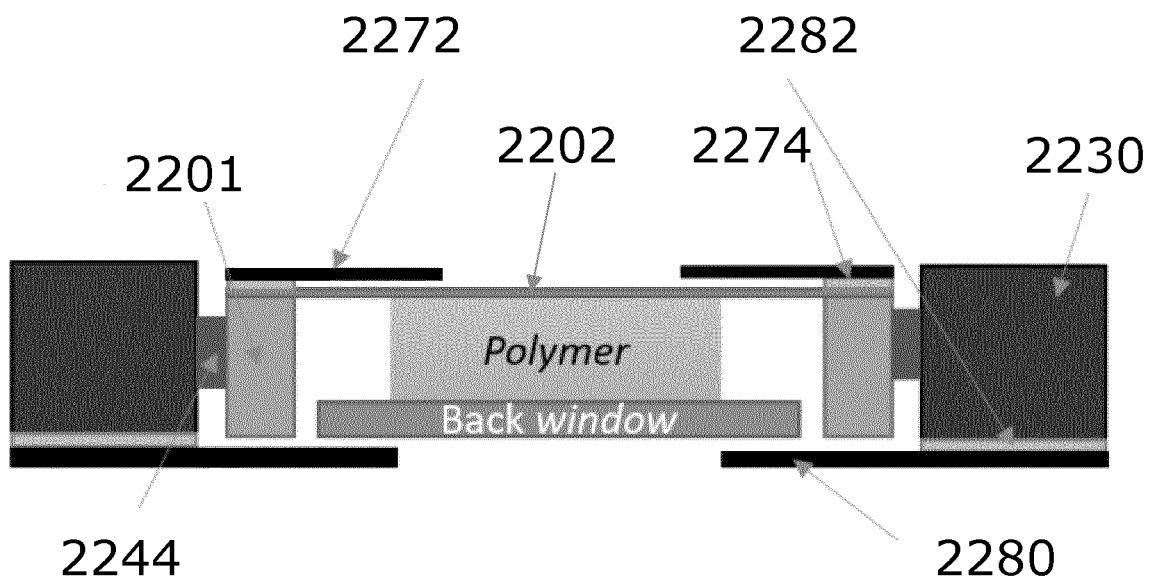

FIG. 22 shows an embodiment of the fourth alternative optical element which is similar to the embodiment of FIG. 2 (cf., e.g., 'polymer' lens body and back window) except that it does not have the (protruding) structural element 128 (which it could have in another embodiment) and it does not have neither the soft object side cap ("blacksheet") 232 nor the adhesive 234. Furthermore, in contrast with the embodiment of FIG. 2 the embodiment of FIG. 22 has the first element 2272 ('hard cap'), the second element 2274 ('hard cap adhesive'), the third element 2280 ('hard cap') and the fourth element 2282 ('hard cap adhesive'). An advantage of the fourth alternative optical element may be that the cover member is free to move during normal use, but has its movement inhibited to avoid excessive stress during impacts. Another advantage is that it may be easier technologically to glue cap 2280 only to the package 2230 (FIG. 22) than to glue it both to the package and to the optical lens (FIG. 2), which may in embodiments be referred to as TLens. The first element 2272 and the third element 2280 can be made of steel of thickness 10-1000 micrometer. The second element 2274 and the fourth element 2282 can be epoxy (or an acrylic or silicone adhesive) of thickness 10-1000 micrometer and can have Young's modules E within 1-100 MPa. It may be an advantage that the second element 2274 and/or the fourth element 2282 are as stiff as possible.

A fifth alternative optical lens comprises

A supporting structure, a bendable cover member attached to the supporting structure, one or more actuators arranged for shaping said bendable cover member into a desired shape, A first element 2384 being more rigid than the bendable cover member and arranged to encircle the optical axis and being placed on the moulded package and the back window, A second element 2385 being an adhesive connecting the first element 2384 and the back window, A third element 2386 being an adhesive connecting the first element 2384 and the moulded package, A fourth element 2387 being more rigid than the bendable cover member and arranged to encircle the optical axis and being placed on the first element 2384, A fifth element 2388 being an adhesive connecting the fourth element 2387 and the first element 2384, such as wherein the first, second, third, fourth and fifth elements (2384, 2385, 2386, 2387, 2388) are being placed so as to inhibit motion of the back window in at least one direction along the optical axis. The flexural rigidity of the first, second, third, fourth and fifth elements (2384, 2385, 2386, 2387, 2388) is sufficiently large to block large motion of the back window in the drop test and at the same time sufficiently small so as to not disturb small motion of the back window, for example when the piezo-film is actuated in normal operation mode.

Figure 23:
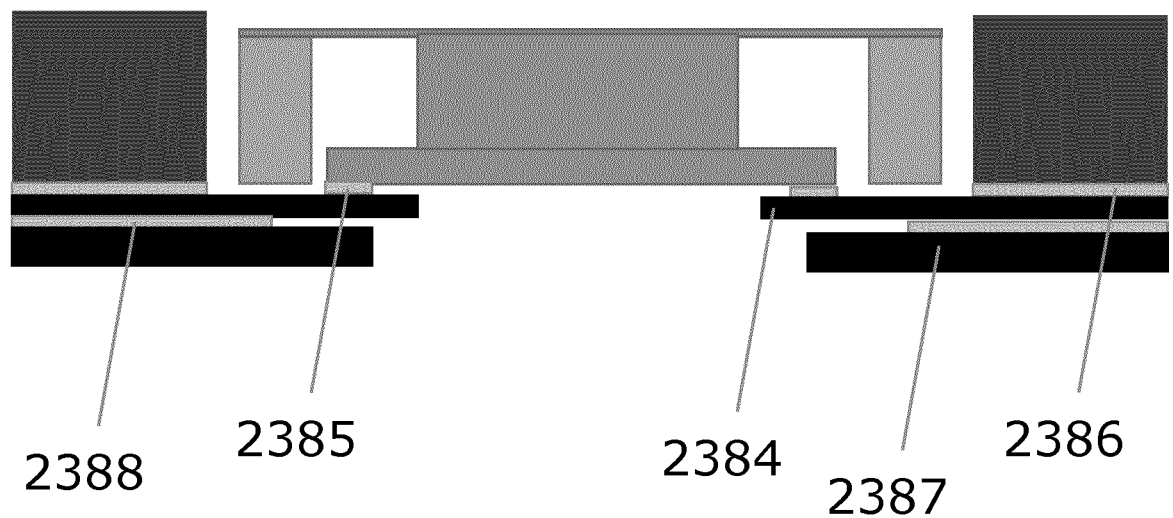

FIG. 23 shows an embodiment of the fifth alternative optical element which is similar to the embodiment of FIG. 2 (cf., e.g., 'polymer' lens body and back window) except that it does not have the (protruding) structural elements 128 (which it could have in another embodiment) and it does not have neither the soft object side cap ("blacksheet") 232 nor the adhesive 234. Furthermore, in contrast with the embodiment of FIG. 2 the embodiment of FIG. 23 has the first, second, third, fourth and fifth elements 2384-2388.

Figure 24:
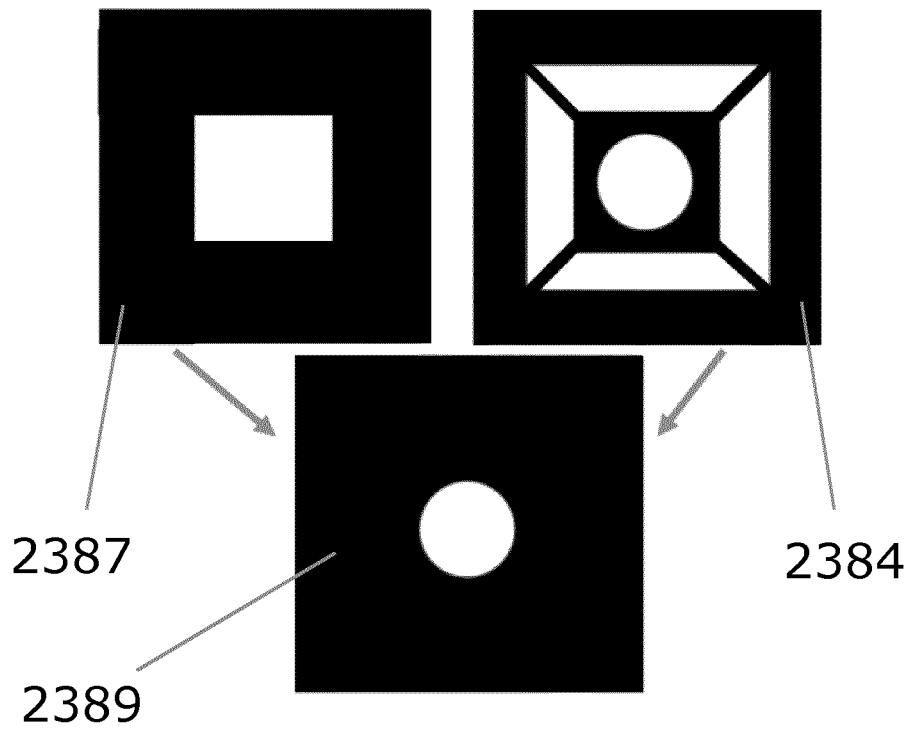

FIG. 24 shows a view from a point on the optical axis of the first element 2384 and the fourth element 2387 and both of the above combined 2389.

The first element 2384 can be made of polyimide of thickness 10-1000 micrometer or any other material with the Young's modulus less than 10 MPa. It should not be too stiff to avoid too much influence on optical parameters of the optical lens. The second element 2385, the third element 2386 and the fifth element 2388 (which may be adhesive layers) may be epoxy (or an acrylic or silicone adhesive) of thickness 10-1000 micrometer and may have a Young's modulus E within 1-100 MPa. The first element 2384 might not be essential for impact resistance, but may be relevant for blocking unnecessary light from being transmitted through the optical element. The first element and/or the fourth element 2387 can be made of any standard black material (such as SOMABLACK film made of "polyester film in which carbon black is mixed", cf., e.g., http://www.somar.co.jp/english/products/03_somablack.html as retrieved on Apr. 26 2018). It may be an advantage that the fourth element 2387 and/or one or more of the second element 2385, the third element 2386 and the fifth element 2388 (which may be adhesive layers) are as stiff as possible.

A sixth alternative optical lens comprises

A supporting structure 2501, a bendable cover member attached to the supporting structure, one or more actuators arranged for shaping said bendable cover member into a desired shape, at least one deformable transparent lens body (indicated with dashed lines) surrounded by a sidewall of the supporting structure 2501 and being attached to the bendable cover member, a back window 2506 attached to the lens body on the opposite side (with respect to a direction being parallel with the optical axis) of the lens body with respect to the bendable cover member, A first element 2591 being more rigid than the bendable cover member and arranged to encircle the optical axis and being placed on the back window, A second element 2592 being an adhesive connecting the first element 2591 and the back window, A third element 2593 being an adhesive connecting the third element 2593 and the supporting structure or an element connected to the supporting structure, wherein the first, second and third elements are arranged so as to allow the back window to move freely below a threshold displacement (optionally a first and second threshold displacement for, respectively an up or down direction along the optical axis) and to inhibit movement beyond said threshold displacement. By 'more rigid' may be understood higher flexural rigidity. This may be achieved with a higher Young's modulus and/or larger thickness (i.e., dimension in a direction parallel with the optical axis).

Figure 25:
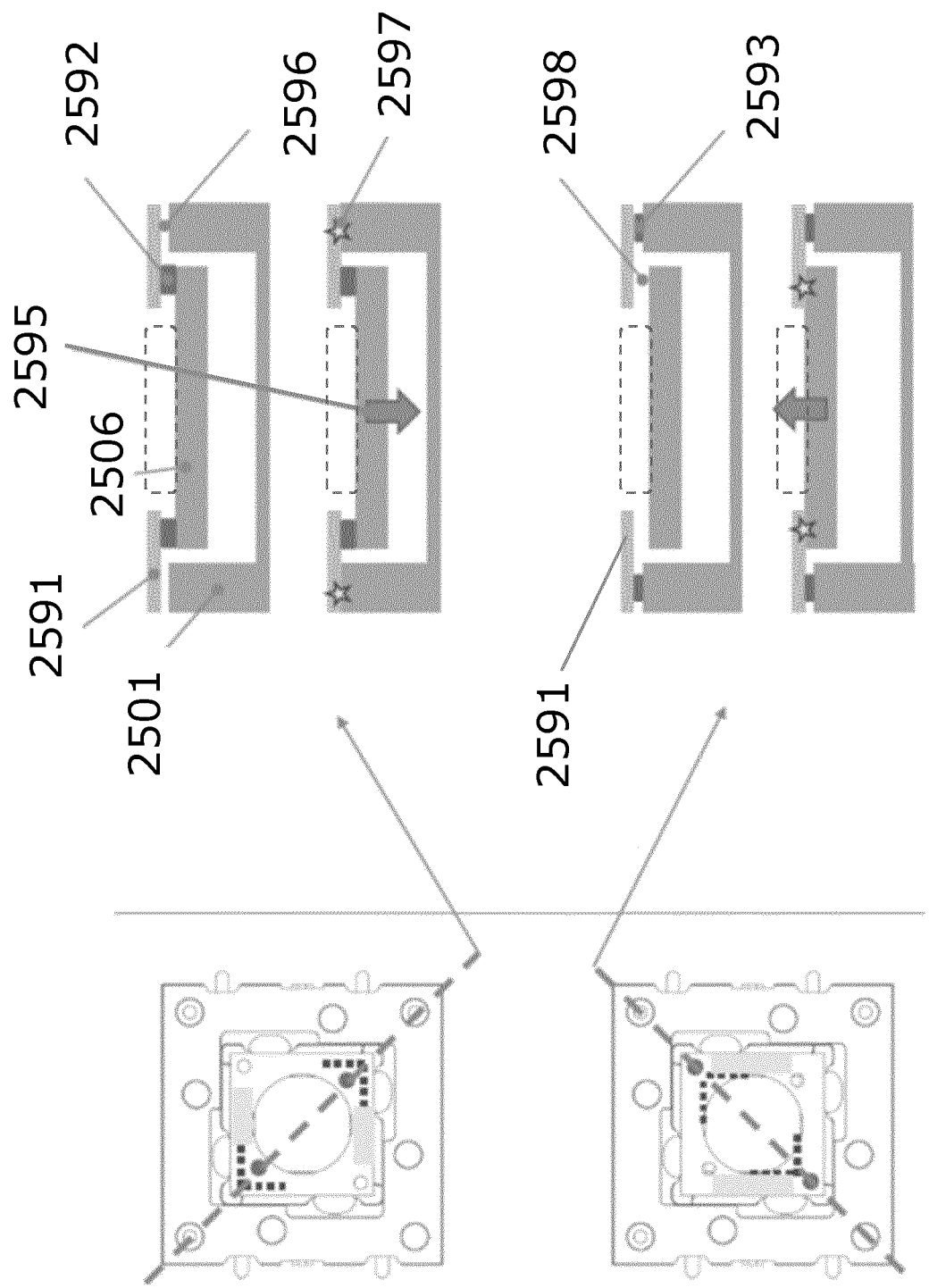

FIG. 25 shows an embodiment of the sixth alternative optical element which is similar to the embodiment of FIG. 2 (cf., e.g., 'polymer' lens body and back window) except that it does not have the (protruding) structural elements 128 (which it could have in another embodiment) and it does not have neither the soft object side cap ("blacksheet") 232 nor the adhesive 234. Furthermore, in contrast with the embodiment of FIG. 2 the embodiment of FIG. 25 has the first, second and third elements 2591-2593. The figure shows in the upper half arrangement of the optical lens along a first diagonal and in the lower half arrangement along the other diagonal. Arrow 2595 indicates movement of back window in impact in one direction (the lower arrow indicates movement of impact in the opposite direction). The circle 2596 indicates the gap defined by the second element 2592. The star 2597 indicates the stop inhibiting further movement. The circle 2598 indicates the gap defined by the third element 2593. The first element 2591 can be made of polyimide with a thickness of 10-1000 micrometer or any other material with the Young's modulus less than 10 MPa. The second element 2592 and the third element 2593 (which may each be a glue may be epoxy (or an acrylic or silicone adhesive) of thickness within 10-1000 micrometer and may have a Young's modulus E within 1-100 MPa. The first element 2591 should not be too stiff to avoid too much influence of on optical parameters of the optical element.

To sum up, there is presented an optical element 100, such as a tuneable lens, wherein there is provided means 128 to mitigate problems with stress concentration (stress singularity) in a bendable cover member 102 at a border of a supporting structure 101, which in the absence of said means would entail a stress singularity issue due to an abrupt change in mechanical properties around the bendable cover member 102.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An optical element defining an optical axis and comprising:
    a supporting structure,
    a bendable cover member attached to the supporting structure, wherein an interface between the bendable cover member and the supporting structure defines an interface plane,
    one or more actuators arranged for shaping said bendable cover member into a desired shape,
    at least one deformable transparent lens body attached to the bendable cover member,
    wherein
    one or more of:
        a dimension in a direction being parallel with the optical axis, and/or
        a Young's modulus
    of the supporting structure on one side of the interface plane increases gradually and/or in a plurality of steps along at least a portion of a line being orthogonal to the optical axis and intersecting the optical axis and in a direction away from the optical axis, wherein said line spans a range from a point at an inner edge of the interface and a point more distantly placed with respect to the optical axis,
    and/or wherein
    a dimension of the bendable cover member in a direction being parallel with the optical axis is larger
        at at least one first point at an inner edge of the interface, than
        at at least one second point on a line from said first point to the optical axis,
    and wherein the Young's modulus of the supporting structure is less than the Young's modulus of the bendable cover member.

2. The optical element according to claim 1, wherein the supporting structure comprises:
    a support element, and
    a structural element adjoining
        the support element, and
        the bendable cover member.

3. The optical element according to claim 1, wherein a dimension of the supporting structure in a direction being parallel with the optical axis of the optical element increases gradually and/or in a plurality of steps along a line orthogonal to the optical axis from the optical axis and away from the optical axis.

4. The optical element according to claim 2, wherein a material of the structural element is different from
    a material of the support element, and
    a material of the bendable cover member.

5. The optical element according to claim 2, wherein the structural element comprises a polymer.

6. The optical element according to claim 2, wherein the structural element comprises epoxy.

7. The optical element according to claim 1, wherein the optical element is a refractive lens comprising:
    said at least one deformable transparent lens body surrounded by a sidewall of the supporting structure,
    and wherein the bendable cover member is a bendable transparent cover member which is attached to
        a surface of said at least one deformable transparent lens body.

8. The optical element according to claim 1, wherein the one or more actuators and the bendable cover member are arranged so that the one or more actuators upon actuation are capable of shaping the bendable cover member throughout a range of 5 dioptres or more.

9. The optical element according to claim 1, wherein the plurality of steps comprise at least 3 steps.

10. The optical element according to claim 1, wherein at least a portion of the supporting structure of which the dimension in the direction being parallel with the optical axis, and/or
    the Young's modulus increases gradually and/or in a plurality of steps is located separated from the at least one deformable transparent lens body.

11. A method of manufacturing the optical element according to claim 1 comprising:
    providing the optical element of claim 2; and
    placing a liquid structural element material at the support element, and/or the bendable
    cover member, so as to form the structural element.

12. The method according to claim 2, wherein the liquid structural element material is redistributed via adhesive forces between the liquid structural element material and
    the support element, and/or
    the bendable cover member
    beyond the position where it is placed.

13. A camera comprising
    an optical element according to claim 1.

* * * * *